United States Patent
Pan et al.

(10) Patent No.: US 10,721,297 B2
(45) Date of Patent: Jul. 21, 2020

(54) MANAGING COMMERCE GROUPS AND POSTS IN A SOCIAL NETWORKING SYSTEM

(71) Applicant: Facebook, Inc., Menlo Park, CA (US)

(72) Inventors: Bowen Pan, Palo Alto, CA (US); Samuel Hoang, Marina del Rey, CA (US); Derek Chirk Yin Cheng, Issaquah, WA (US); Oliver Shijie Zheng, Seattle, WA (US); Christina Joan Sauper, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 133 days.

(21) Appl. No.: 14/946,562

(22) Filed: Nov. 19, 2015

(65) Prior Publication Data

US 2017/0149881 A1 May 25, 2017

(51) Int. Cl.
| | | |
|---|---|---|
| *H04L 29/08* | (2006.01) | |
| *H04L 12/58* | (2006.01) | |
| *G06Q 50/00* | (2012.01) | |
| *G06Q 30/06* | (2012.01) | |
| *H04L 12/18* | (2006.01) | |

(52) U.S. Cl.
CPC ..... *H04L 67/1044* (2013.01); *G06Q 30/0601* (2013.01); *G06Q 50/01* (2013.01); *H04L 12/1859* (2013.01); *H04L 51/32* (2013.01)

(58) Field of Classification Search
CPC .... G06Q 10/10; G06Q 30/0283; G06Q 30/02; H04L 29/06; H04L 29/08072; H04L 29/06027; H04L 12/581; G06F 17/30864; G06F 17/30663; G06F 17/30616
USPC ........................................................ 709/204
See application file for complete search history.

(56) References Cited

U.S. PATENT DOCUMENTS

| | | | |
|---|---|---|---|
| 2008/0133305 A1* | 6/2008 | Yates | G06Q 10/08 705/14.4 |
| 2009/0070219 A1* | 3/2009 | D'Angelo | G06Q 10/10 705/14.56 |
| 2009/0070334 A1* | 3/2009 | Callahan | G06F 21/604 |
| 2009/0119167 A1* | 5/2009 | Kendall | G06Q 30/02 705/14.17 |
| 2009/0182589 A1* | 7/2009 | Kendall | G06Q 10/02 705/5 |
| 2010/0164957 A1* | 7/2010 | Lindsay | G06Q 10/10 345/440 |
| 2010/0169327 A1* | 7/2010 | Lindsay | G06F 17/30675 707/750 |
| 2010/0217645 A1* | 8/2010 | Jin | G06Q 10/10 705/14.44 |
| 2011/0161987 A1* | 6/2011 | Huang | G06Q 10/10 719/318 |
| 2011/0231240 A1* | 9/2011 | Schoen | G06Q 30/0242 705/14.41 |

(Continued)

*Primary Examiner* — Mahran Y Abu Roumi
(74) *Attorney, Agent, or Firm* — Keller Jolley Preece

(57) ABSTRACT

The present disclosure is directed toward systems and methods for managing commerce related groups and communications within a social networking system. For example, systems and methods described herein can identify characteristics of social networking system groups and posts, and determine, based on the identified characteristics, whether the social networking system groups and posts are for-sale groups and sale listings, respectively.

20 Claims, 8 Drawing Sheets

(56) References Cited

U.S. PATENT DOCUMENTS

| | | | |
|---|---|---|---|
| 2012/0016817 A1* | 1/2012 | Smith | G06N 99/005 706/12 |
| 2012/0290446 A1* | 11/2012 | England | G06Q 30/0282 705/27.1 |
| 2013/0159115 A1* | 6/2013 | Adams | G06Q 50/01 705/14.66 |
| 2013/0179504 A1* | 7/2013 | Adams | G06Q 30/02 709/204 |
| 2014/0081909 A1* | 3/2014 | Price | G06Q 50/01 707/609 |
| 2014/0136364 A1* | 5/2014 | Gadre | G06Q 30/0633 705/26.8 |
| 2014/0279208 A1* | 9/2014 | Nickitas | G06Q 30/0631 705/26.7 |
| 2014/0289006 A1* | 9/2014 | Palmer | G06Q 30/0204 705/7.31 |
| 2014/0289073 A1* | 9/2014 | Gold | G06Q 30/0639 705/26.9 |
| 2014/0317142 A1* | 10/2014 | Naidu | G06F 17/30542 707/780 |
| 2014/0337254 A1* | 11/2014 | Chen | G06N 99/005 706/12 |
| 2015/0025950 A1* | 1/2015 | Yu | G06Q 30/0274 705/14.7 |
| 2015/0088650 A1* | 3/2015 | Taylor | G06F 17/30684 705/14.54 |
| 2015/0106304 A1* | 4/2015 | Gupta | G06N 5/04 706/11 |
| 2015/0120386 A1* | 4/2015 | Sherman | G06Q 30/0202 705/7.31 |
| 2015/0127418 A1* | 5/2015 | Piepgrass | G06Q 30/0201 705/7.29 |
| 2015/0199772 A1* | 7/2015 | Sherman | G06Q 30/0643 705/319 |
| 2015/0324892 A1* | 11/2015 | Matousek | G06Q 30/06 705/26.62 |
| 2015/0332362 A1* | 11/2015 | Kalt | G06Q 30/0611 705/26.4 |
| 2015/0339688 A1* | 11/2015 | Steiert | G06Q 30/0204 705/7.33 |
| 2015/0350149 A1* | 12/2015 | Acharya | H04L 51/32 709/206 |
| 2016/0140619 A1* | 5/2016 | Soni | G06Q 30/0269 705/14.66 |
| 2016/0155181 A1* | 6/2016 | Romaya | G06Q 30/0282 705/26.63 |
| 2016/0292288 A1* | 10/2016 | Walton | G06F 17/30699 |
| 2016/0321261 A1* | 11/2016 | Spasojevic | G06F 17/3053 |
| 2017/0004567 A1* | 1/2017 | Dutt | G06Q 30/0643 |
| 2017/0064034 A1* | 3/2017 | Vasthimal | H04L 67/306 |
| 2017/0109807 A1* | 4/2017 | Krishnan | G06Q 30/0631 |

\* cited by examiner

MANAGING COMMERCE GROUPS AND POSTS IN A SOCIAL NETWORKING SYSTEM

CROSS REFERENCE TO RELATED APPLICATIONS

N/A

BACKGROUND

1. Technical Field

One or more embodiments of the present disclosure relate generally to commerce within a social networking system. More specifically, one or more embodiments of the present disclosure relate to managing commerce related groups and communications within a social networking system.

2. Background and Relevant Art

While formal commercial settings are commonly utilized for the purchase of goods, people also buy and sell goods in informal commercial settings. For example, garage sales, yard sales, and estate sales provide a setting where individuals can negotiate the sale and purchase of a wide range of goods. These informal commercial settings embody the notion that "one man's trash is another man's treasure," and provide individuals with ways to sell things they no longer want, or purchase things they need for less than they would typically spend in a formal commercial setting.

It is not surprising that the garage sale format of buying and selling goods has transitioned online via social networking systems. A social networking system generally allows for the formation of forum-like groups dedicated to a singular purpose. Social networking system users can join a social networking system group to participate in discussions, ask questions, post articles, etc. A social networking system "for-sale" group typically functions like a neighborhood garage sale and allows users to submit sale listings that advertise goods they would like to buy or sell. Users can utilize the functionality of the social networking system to inquire after a particular item they would like to buy, or sell a particular item that they no longer need.

Additionally, users can also buy and sell items via their own personal newsfeeds within a social networking system. For example, a user's personal newsfeed can include social networking system posts from the user's social networking system "friends" or co-users. Thus, a user can create a social networking system post or "sale listing" advertising an item for sale. Once the user creates the sale listing, the user can submit the sale listing to the social networking system for distribution via the newsfeeds of the user's friends.

Problems arise, however, due to the fact that a social networking system generally does not specifically classify a particular social networking system group as a for-sale group. For example, even though the social networking system may host a particular group where members buy and sell various goods, the social networking system generally has no mechanism to classify that particular group in a different manner from other social networking system groups that have no commercial intent. Accordingly, because the particular group is not appropriately classified as a for-sale group, the social networking system may fail to include the particular group in relevant search results, or may fail to suggest membership in the particular group to a social networking system user who would benefit from knowing that the particular group exists.

Similarly, further problems arise in light of the fact that a social networking system generally does not specifically classify a social networking system post as a sale listing. For example, a social networking system user may compose a social networking system post for the purpose of advertising a particular item that the user would like to sell (e.g., a sale listing). However, because the social networking system has no specific classification for sale listings, the social networking system may not include the user's post in relevant searches. Furthermore, the social networking system may not submit the user's post to newsfeeds and groups where the post will have the greatest advantage.

Thus, there are several disadvantages to current methods for managing commerce related groups and communications within a social networking system.

SUMMARY

One or more embodiments described herein provide benefits and/or solve one or more of the foregoing or other problems in the art with systems and methods for managing commerce related groups and communications within a social networking system. One or more embodiments described herein include systems and methods for managing commerce related groups by identifying social networking system characteristics related to a group that indicate the group is likely a for-sale group, as opposed to a general discussion related group. In response to determining that a social networking group is likely a for-sale group, systems and methods described herein can classify the group such that the group is optimized within the social networking system.

Additionally, one or more embodiments described herein include systems and methods for managing commerce related social network system posts by identifying social networking system characteristics related to a social networking system post that indicate the post is likely a sale listing. In response to determining that the social networking system post is likely a sale listing, systems and methods described herein can classify the post such that the post is optimized within the social networking system. Thus, systems and methods described herein classify commerce related for-sale groups and sale listings in order to ensure commerce related for-sale groups and sale listings are optimized within the social networking system.

Additional features and advantages of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments of the disclosure will be described and explained with additional specificity and detail through the use of the accompanying drawings in which.

DETAILED DESCRIPTION

Figure 1:
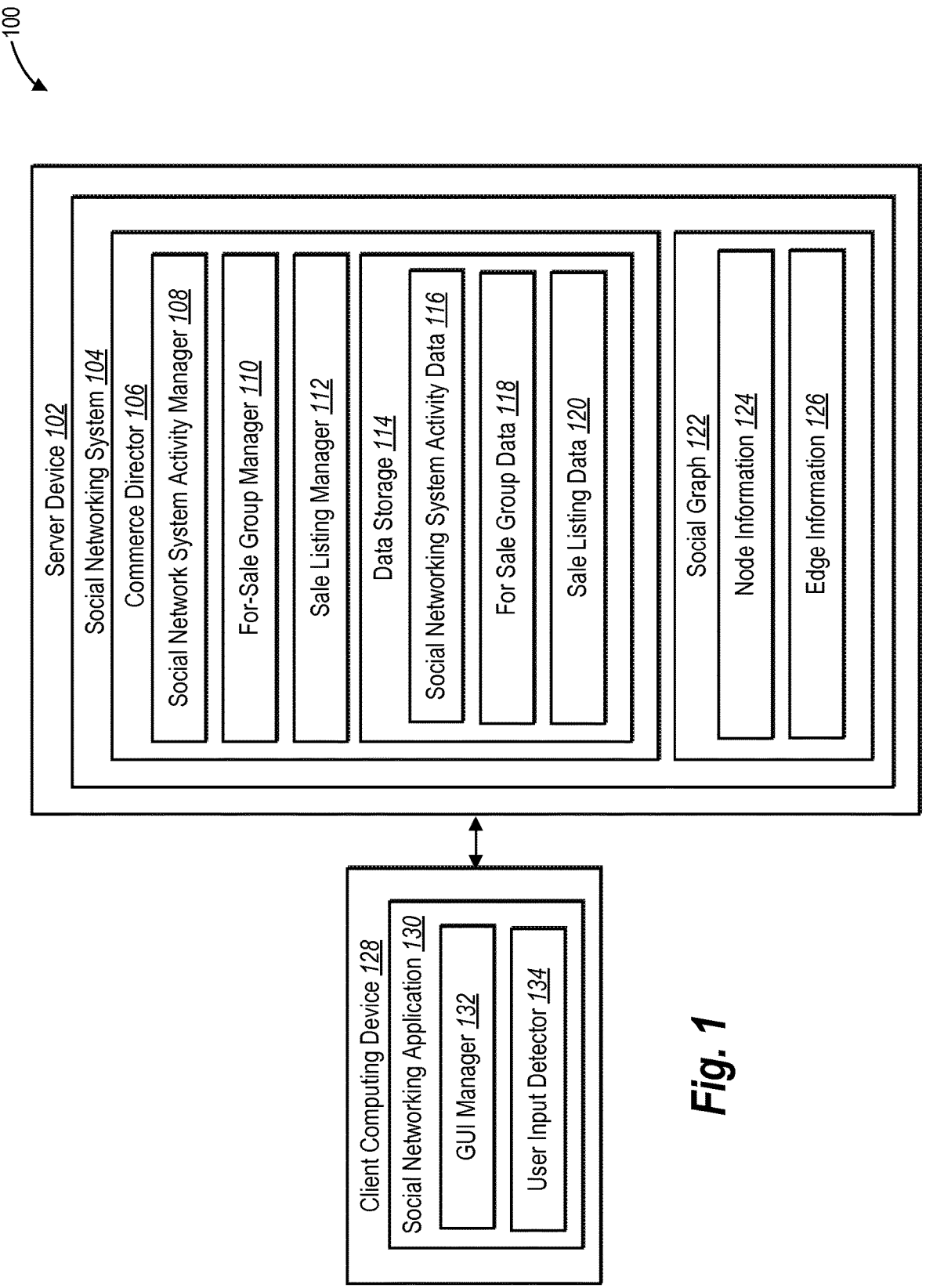
FIG. 1 illustrates a detailed schematic diagram of a commerce system in accordance with one or more embodiments.

One or more embodiments described herein provide benefits and/or solve one or more of the foregoing or other problems in the art with systems and methods for managing commerce related groups and communications within a social networking system. For example, the commerce system of one or more embodiments described herein can identify social networking system characteristics associated with a social networking system group that are indicative of that group actually being a for-sale group. Based on the identified group characteristics, embodiments described herein can classify the social networking system group as a for-sale group. Similarly, the commerce system of one or more embodiments described herein can identify social networking system characteristics associated with a social networking system post that are indicative of that post actually being a sale listing. The commerce system can then classify the post as a sale listing based on the post's identified characteristics.

For example, with reference to a social networking system group, the commerce system described herein can identify various characteristics associated with the social networking system group that may indicate that the group is really a for-sale group. To illustrate, a characteristics related to the membership of the group (e.g., whether the group members are friends with each other, whether the group members are located within a similar geographic region, etc.) can provide an indication as to whether the group is really a for-sale group. Additionally, characteristics related to posts included within the group (e.g., content of the posts, multimedia included in the posts, etc.) can provide an indication as to whether the group is really a for-sale group. The variety of characteristics associated with the social networking system group are discussed in further detail below. The commerce system can then determine, based on the various identified characteristics, whether the social networking system group is likely a for-sale group.

Similarly, with reference to a social networking system post, the commerce system described herein can identify various characteristics associated with the post that may indicate the post is really a sale listing. To illustrate, characteristics related to the content of a post (e.g., multimedia featuring a particular product, descriptive language, etc.) can provide an indication as to whether the post is really a sale listing. Other characteristics associated with the post may include information related to the author of the post, information related to social networking activities associated with the post (e.g., comments, likes, etc.), etc. Following this, the commerce system can determine, based on the various identified characteristics, whether the social networking system post is actually a sale post.

Once the commerce system has accurately determined the correct classification for a given social networking system group or post, the commerce system can update information associated with the group or post. For example, in response to determining that a social networking system group is actually a for-sale group, the commerce system can update classification information associated with the for-sale group. Thus, the commerce system can correctly include the for-sale group in related searches and suggest membership in the for-sale group to social networking system users who might benefit from being members of the for-sale group. Similarly, in response to determining that a social networking system post is actually a sale listing, the commerce system can update the classification information associated with the sale listing. Accordingly, the commerce system can correctly include the sale listing in related searches, and can suggest submission of the sale listing to for-sale groups where the sale listing will likely gain traction.

As used herein, the term "social networking system" refers to a system that supports and enables on-line communication, input, interaction, content-sharing, and collaboration between users. A user of the social networking system can have one or more "friends" via the social networking system. As used herein, the term "friend" refers to a co-user associated with a user via the social networking system (i.e., a contact or connection). Furthermore, as used herein, a "for-sale group" is a group within the social networking system where users (who may or may not be friends) can submit standard social networking system posts, as well as sale listings that advertise items that are for sale. By utilizing the functionality of the social networking system (i.e., via comments, messages, "likes," etc.), purchasers and sellers can coordinate the purchase and sale of items through for-sale groups. For-sale groups may or may not require participants to become group members before viewing and/or submitting sale listings.

As mentioned above, in one or more embodiments, a user may send one or more social networking system posts via the social networking system. As used herein, a "post" refers to an electronic communication submitted by a social networking system user to the social networking system. In one embodiment, a post is an electronic communication from a user that the social networking system displays on a newsfeed (i.e., a "wall") associated with every friend of the user. Additionally or alternatively, a post can be an electronic communication from a user that the social networking system displays on a newsfeed of a particular group within the social networking system.

While a social networking system is predominantly concerned with enabling social networking system communications between users, in one or more embodiments, as mentioned above, the social networking system can also enable commercial transactions. For example, in one embodiment, a social networking system can support for-sale groups or communities of users who are interested in the purchase and/or sale of various items. For instance, a social networking system for-sale group may be dedicated to the purchase and sale of classic car parts. By utilizing various features of the social networking system, the member of the classic car parts group can communicate with each other about parts for sale, prices, locations, etc., and eventually arrange for the sale and purchase of the parts. In one embodiment, the social networking system can include payment features that allow for a group member to fund the transaction and complete the sale via the for-sale group.

In one or more embodiments described herein, an item seller may utilize the social networking system to facilitate the advertising and sale of the item. For example, in one embodiment, the seller can compose a social networking system post that advertises the item for sale (or simply a "sale listing"). As used herein, a "sale listing" within a for-sale group or personal newsfeed refers to a social networking system post composed by an item seller that advertises the item for sale. The seller can include information related to the product in the social media post, which, when the seller submits the sale listing to the social networking system, then becomes part of the structured data associated with the sale listing.

As used herein, "structured data" can include any data that is structured into specific groups, fields, or categories and/or associated with particular aspects of a post, a person, or a product being sold. Structured data can include metadata associated with node and edge information related to the social networking system post, information related to the post author, information related to a particular item featured in the post, and interaction information related to the post within the social networking system. To illustrate, structured data for a social networking system post may include the post author's name, the content of the post, the post author's location, information related to a group or newsfeed where the post author submitted the post, or any other specific types of information/data associated with the post. The structured data may also include various media content such as images (e.g., pictures of a particular item), video, audio, etc. Using this structured data, the social networking system can facilitate the insertion of "rich" objects within a newsfeed or elsewhere, such rich objects providing more information and/or content than typical textual messages.

FIG. 1 illustrates a schematic diagram illustrating an example embodiment of a commerce system 100 (or simply "system 100"). As shown in FIG. 1, the system 100 may include various components for performing the processes and features described herein. For example, as shown in FIG. 1, the system 100 may include, but is not limited to, one or more server devices 102, a social networking system 104, a commerce director 106, and at least one client computing device 128. The commerce director 106 can include, but is not limited to, a social networking system activity manager 108, a for-sale group manager 110, a sale listing manager 112, and a data storage 114, which includes social networking system activity data 116, for-sale group data 118, and sale listing data 120. The client computing device 128 can include a social networking application 130, which includes a display manager 132 and a user input detector 134. Additionally, the social networking system 104 can include a social graph 122, which includes node information 124 and edge information 126.

The social networking system 104, each of the components 108-122, and each of the components 132 and 134 of the social networking application 130 can be implemented using a computing device including at least one processor executing instructions that cause the system 100 to perform the processes described herein. In some embodiments, the components 102-134 can be implemented by a single server device 102, or across multiple server devices 102. Additionally or alternatively, a combination of one or more server devices and one or more client devices can implement the components 102-134. Furthermore, in one embodiment, the components 102-134 can comprise hardware, such as a special-purpose processing device to perform a certain function. Additionally or alternatively, the components 102-134 can comprise a combination of computer-executable instructions and hardware.

In one or more embodiments, the social networking application 130 can be a native application installed on the client computing device 128. For example, the social networking application 130 may be a mobile application that installs and runs on a mobile device, such as a smart phone or a tablet. Alternatively, the social networking application 130 can be a desktop application, widget, or other form of a native computer program. Alternatively, the social networking application 130 may be a remote application accessed by the client computing device 128. For example, the social networking application 130 may be a web application that is executed within a web browser of the client computing device 128.

As mentioned above, and as shown in FIG. 1, the social networking application 130 can include a graphical user interface (or simply "GUI") manager 132. The GUI manager 132 can provide, manage, and/or control a graphical user interface (or simply "user interface") that allows a user to compose, view, and submit electronic messages, social networking system posts, sale listings, etc. Furthermore, the GUI manager 132 can provide a user interface that facilitates the display of a for-sale group containing one or more sale listings. Likewise, the GUI manager 132 can provide a user interface that facilitates the display of a social networking system user's newsfeed or wall. Similarly, the GUI manager 132 can provide a user interface that displays one or more electronic messages received by a social networking system user.

More specifically, the GUI manager 132 can facilitate the display of a user interface (e.g., by way of a display device associated with the client computing device 128). For example, the GUI manager 132 may compose the user interface of a plurality of graphical components, objects, and/or elements that allow a user to compose, send, and receive electronic messages, social networking system posts, and/or sale listings. More particularly, the GUI manager 132 may direct the client computing device 128 to display a group of graphical components, objects, and/or elements that enable a user to view electronic messages, social networking system posts, sale listings, etc.

In addition, the GUI manager 120 may direct the client computing device 128 to display one or more graphical objects, controls, or elements that facilitate user input for composing, sending, and/or submitting a social networking system post, electronic message, or sale listing. To illustrate, the GUI manager 132 may provide a user interface that allows a user to provide user input to the social networking application 130. For example, the GUI manager 132 can provide one or more user interfaces that allow a user to input one or more types of content into a social networking system post, an electronic message, a sale listing, etc. As used herein, "content" refers to any data or information to be included as part of a social networking system post, message, or listing. For example, the term "content" will be used herein to generally described text, images, digital media, files, location information, payment information, or any other data that can be included as part of a social networking system post, message, or listing.

The GUI manager 132 can also facilitate the input of text or other data to be included in a social networking system post, message, or listing. For example, the GUI manager 132 can provide a user interface that includes a touch display keyboard. A user can interact with the touch display keyboard using one or more touch gestures to input text or other types of input to be included in a social networking system post, message, or listing. For example, a user can use the touch display keyboard to enter a description of an item in a sale listing. In addition to text, the user interface including the touch display keyboard can facilitate the input of various other characters, symbols, icons, or other information.

Furthermore, the GUI manager 132 can provide and transition between two or more graphical user interfaces. For example, in one embodiment, the GUI manager 132 can provide a newsfeed to a social networking system user containing one or more social networking system posts from co-users associated with the user via the social networking system. Later, in response to detected input from the user, the GUI manager 132 can transition to a second graphical user interface that includes listings and posts within a particular for-sale group.

As further illustrated in FIG. 1, the social networking application 130 can include a user input detector 134. In one or more embodiments, the user input detector 134 can detect, receive, and/or facilitate user input in any suitable manner. In some examples, the user input detector 122 can detect one or more user interactions with respect to the user interface. As referred to herein, a "user interaction" means a single interaction, or combination of interactions, received from a user by way of one or more input devices.

For example, the user input detector 134 can detect a user interaction from a keyboard, mouse, touch pad, touch screen, and/or any other input device. In the event the client computing device 128 includes a touch screen, the user input detector 134 can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The user input detector 134 may additionally, or alternatively, receive data representative of a user interaction. For example, the user input detector 134 may receive one or more user configurable parameters from a user, one or more user commands from the user, and/or any other suitable user input. The user input detector 134 may receive input data from one or more components of the social networking system 104, or from one or more remote locations.

The social networking application 130 can perform one or more functions in response to the user input detector 134 detecting user input and/or receiving other data. Generally, a user can control, navigate within, and otherwise use the social networking application 130 by providing one or more user inputs that the user input detector 134 can detect. For example, in response to the user input detector 134 detecting user input, one or more components of the social networking application 130 allow a user to select a recipient for a message, compose a message, select content to include in a message, and/or send a message to the recipient. Additionally, in response to the user input detector 134 detecting user input, one or more components of the social networking application 130 allow a user to navigate through one or more user interfaces to review received electronic messages, sale listings, etc.

As illustrated in FIG. 1, the commerce system 100 can include the social networking system 104 hosted by a server device 102. The social networking system 104 can provide social networking system posts (whether text or otherwise) to a graphical user interface (e.g., a profile, a newsfeed, or "wall") of one or more users of the social networking system 104. For example, one or more embodiments may present a user with a social networking system newsfeed and electronic messages from one or more co-users associated with the user via the social networking system 104. In one or more embodiments, the user may scroll through the social networking system newsfeed in order to view recent social networking system posts submitted by the one or more co-users associated with the user via the social networking system 104. In one embodiment, the social networking system 104 may organize the social networking system posts and/or sale listings chronologically in a user's social networking system newsfeed. In alternative embodiments, the social networking system 104 may organize the social networking system posts geographically, by interest groups, according to a relationship coefficient between the user and the co-user, etc. Additionally, in one or more embodiments, the user may download a copy of the social networking system newsfeed as a record of the social networking system posts displayed therein.

Additionally, in one embodiment, the social networking system 104 can transmit social networking system posts, electronic messages, and/or sale listings between users. For example, in response to a user submitting a social networking system post to the social networking system 104, the social networking system 104 can update the social networking system newsfeeds of the co-users who are "friends" with the user to include the submitted social networking system post. Furthermore, in one embodiment, the social networking system 104 can transmit an electronic message between just two users. In that case, the social networking system 104 does not add the electronic message to the social networking system newsfeed of a plurality of co-users, but rather provides the electronic message within a social networking system graphical user interface (e.g., an inbox) of one or more message recipients. In other words, an electronic message can be a private message between two users of the social networking system 104, and a social networking system post or sale listing may be a semi-public message that the social networking system 104 adds to the social networking system newsfeed of a plurality of co-users of the social networking system 104 or to a newsfeed associated with a particular social networking system group (e.g., a for-sale group).

As mentioned above, and as illustrated in FIG. 1, the social networking system 104 can further include the commerce director 106, which can direct and manage all commerce activities in connection with the social networking system 104. The commerce director 106 can include a social networking system activity manager 108, which in turn can communicate with the social networking system 104 to receive various types of information. In one or more embodiments, the social networking system activity manager 108 can receive information related to social networking system users, as well as information related to social networking system groups and the posts and listings therein.

For example, the social networking system activity manager 108 can receive information related to a social networking system user including demographic information for the user. In one or more embodiments, a user's demographic information can include, but is not limited to, the user's gender, age, education, location, hometown, birthday, employment, salary, family and romantic relationships, and so forth. Additionally, a user's demographic information can be related to the user's personal interest (e.g., favorite books, movies, restaurants, etc.). The social networking system activity manager 108 can identify this information through an analysis of the user's social networking system profile, account information, or via other social networking system activities in which the user engages.

Furthermore, the social networking system activity manager 108 can receive information related to social networking system relationships between users. For example, a social networking system user may be "friends" with one or more additional users. Thus, in one or more embodiments, the user can view social media posts submitted by friends, comment on friends' social media posts, replay to messages sent by friends, add tags to photographs and videos submitted by friends, view location check-ins of friends, etc. The social networking system activity manager 108 can identify information related to any of these user-to-user interactions and relationships.

Additionally, the social networking system activity manager 108 can receive information related to specific activities in which a social networking system user engages. For example, through the social networking system, a social networking system user can submit posts, send private messages, comment on other user's posts and media, tag posts and media, "like" other user's posts and comments, submit sale listings, and share the posts and/or sale listings of other users. In one or more embodiments, the social networking system activity manager 108 can identify the content of any of these types of interactions, as well as structured data associated with the post, message, comment, sale listing, etc.

The social networking system activity manager 108 can also receive information related to other activities in which a user engages such as media uploads, user tags, and check-ins. For example, in one or more embodiments, a user can upload various media (e.g., digital photographs, digital videos, audio files, etc.) to the social networking system for inclusion in posts, messages, archives, etc. Additionally, in one or more embodiments, the user can tag other users in connection with uploaded media and/or posts, sale listings, etc. As used herein, tagging a user simply means that the social networking system 104 creates a record that the tagged user is associated (e.g., as being present, at the same location, connected with, etc.) with the media and/or post in which the tagged user is tagged. Furthermore, in one or more embodiments, the user can check-in at various locations, as a way of informing friends of the user's presence at a given location. The social networking system activity manager 108 can identify information related to any of these activities.

Furthermore, the social networking system activity manager 108 can receive information related to various web page interactions that a user makes in connection with the social networking system 104. For example, as described above, the social networking system 104 can present a range of content via one or more web pages. Accordingly, the social networking system activity manager 108 can receive information related to a social networking system user's clicks (e.g., clicks on various hyperlinks or other controls), the social networking system user's views (e.g., of web pages, media, or other web content), and the social networking system user's scrolls (e.g., how quickly the user scrolls through content, scroll positions associated with where the user pauses in a web page, etc.).

As mentioned above, the social networking system activity manager 108 can also receive information related to groups as well as the posts, and sale listings therein. For example, the social networking system activity manager 108 can receive information associated with the membership of a particular group. In one or more embodiments, in order for a social networking system user to view and/or submit sale listing to a particular for-sale group hosted by the social networking system 104, the user must first be a member of the for-sale group. Generally, a user may be a member of multiple groups. Accordingly, the social networking system activity manager 108 can receive information detailing the membership records of any group hosted by the social networking system 104.

In addition to information about a group's membership records, the social networking system activity manager 108 can receive additional information specific to a group. For example, the social networking system activity manager 108 can receive information associated with all the posts and sale listings included in a particular group. As described above, a post is an electronic communication from a user that the social networking system 104 can post to a newsfeed. Also as described above, a user submits a sale listing to advertise an item for sale.

In one or more embodiments, a group may include both posts and sale listings. Accordingly, the social networking system activity manager 108 can receive information associated with both the posts and the sale listings included in a group. Information associated with posts and sale listings can include, but is not limited to, the content of a post or sale listing, social networking system activity associated with a post or sale listing, and structured data associated with a post or sale listing. In one or more embodiments, the content of a post or sale listing can include text, and/or media (e.g., digital photographs, digital video, etc.). Additionally, in one or more embodiments, social networking system activity associated with a post or sale listing can include comments associated with the post or sale listing, messages associated with the post or sale listing, "likes" associated with the post or sale listings, "shares" of the post or sale listing, tags associated with the post or sale listing, check-ins associated with the post or sale listing, views associated with the post or sale listing, etc. Furthermore, structured data associated with a post or sale listing can include information associated with the social networking system user who submitted the post or sale listing, information detailing the date and time the social networking system user submitted the post or sale listing, information associated with social networking system users who engaged in social networking activity associated with the post or sale listing, or any other type of structured data.

The social networking system activity manager 108 can also receive descriptive information associated with a particular group. For example, the social networking system activity manager 108 can receive information that describes the group (e.g., the stated purpose of the group, types of items or topics typically sold or discussed via the group, etc.), information related to the amount of web traffic the group experiences, information related to an average amount of time a sale listing is active via a particular group, etc.

As mentioned above, and as illustrated in FIG. 1, the commerce director 106 can also include a for-sale group manager 110. In one or more embodiments, the social networking system 104 can host a variety of groups, wherein social networking system users can submit posts, comment on posts, message groups members, etc. In at least one embodiment, a subset of the groups hosted by the social networking system 104 are "for-sale" groups, wherein group members buy and sell articles by utilizing various features of the social networking system (e.g., commenting features, transactional features, etc.). As mentioned above, the social networking system 104 has no specific mechanism by which a for-sale group can be labeled as such. Accordingly, the for-sale group manager 110 can monitor and analyze all groups hosted by the social networking system 104 in order to identify the subset of social networking system groups that are for-sale groups.

Thus, in order to identify a for-sale group, the for-sale group manager 110 can monitor the groups hosted by the social networking system 104 for various social networking system characteristics. In one or more embodiments, these characteristics can be indicative of a group being a for-sale group. For example, the for-sale group manager 110 can monitor the membership of a particular group for certain information associated with members of the particular group. For instance, the for-sale group manager 110 can analyze relationships between members of a particular group. In one or more embodiments, a for-sale group tends to have a low density of "friends" among the members of the for-sale group. In other words, a social networking system user who becomes a member of a particular for-sale group typically has few social networking system friends among the other members of that particular for-sale group.

Other characteristics that the for-sale group manager 110 can identify are related to demographic information associated with the membership of a particular group. For example, in one or more embodiments, the membership of a for-sale group tends to predominantly male and usually dispersed geographically but within a particular region. Accordingly, the for-sale group manager 110 can analyze profile information, account information, activity information, etc. associated with the members of a particular group in order to determine a predominant gender found among the group members.

Additionally, the for-sale group manager 110 can analyze profile information, account information, activity information, etc. associated with the members of the particular group in order to determine a location for each of the group members. From this information, the for-sale group manager 110 can determine the geographically diversity of the membership of a particular group. If the membership of the group is dispersed geographically but still within a particular region (e.g., a county, state, country, etc.), the for-sale group manager 110 can determine the particular group is likely a for-sale group.

The for-sale group manager 110 can also monitor social networking system activities of one or more members of a particular group in order to identify characteristics that indicate whether the particular group is a for-sale group. In one or more embodiments, members of a for-sale group tend to comment on and "like" the same types of posts within the for-sale group (e.g., posts that include characteristics indicating they are sale posts). Similarly, in one or more embodiments, members of a for-sale group tend to submit the same types of posts to the for-sale group (e.g., posts that include characteristics indicating they are sale posts). Furthermore, in one or more embodiments, members of a for-sale group tend to compose the same types of private messages to other members of the for-sale group (e.g., private messages that include transactional language so as to arrange a sale). Additionally, in one or more embodiments, members of a for-sale group also tend to "share" or re-post the same types of posts within the for-sale group (e.g., posts that include characteristics indicating they are sale posts).

In addition to analyzing information associated with the membership of a particular group in order to determine whether the group is a for-sale group, the for-sale group manager 110 can also analyze characteristics associated with one or more posts included within a particular group for indicators as to whether the group is a for-sale group. For example, the for-sale group manager 110 can analyze the content and the structured data associated with a post. If the analysis of one or more posts within a particular group reveals indicators that the one or more posts are likely sale listings, the for-sale group manager 110 may determine that the group where the posts were submitted is likely a for-sale group.

To illustrate, a particular post may include content that indicates the post is likely a sale listing. For example, content in a post such as digital photographs featuring items rather than people is indicative of the post being a sale listing. In at least one embodiment, for-sale groups tend to include higher numbers of digital photographs across all posts and sale listings contained therein. Similarly, text in a post including brand names, certain acronyms, phrases, transactional language, etc. is indicative of the post being a sale listing. Furthermore, comments, likes, messages, and shares associated with a post may indicate the post is a sale listing (e.g., comments and messages including transactional language, likes from users who frequently like other sale listings, etc.).

Additionally, a particular post may include structured data that indicates the post is likely a sale listing. As mentioned above, structured data associated with a particular post can include particular aspects associated with the post that may or may not be displayed such as author information, category information, display timing information, node information, edge information, etc. For example, the for-sale group manager 110 can analyze author information within the structured data associated with a post to determine the post is authored by a user who has previously authored other sale listings. Further, the for-sale group manager 110 can analyze display timing information within the structured data associated with a post to determine the post was "active" or displayed for a week before the post author removed the post (i.e., posts that are not sale listings tend to be displayed indefinitely, while sale listings tend to be removed when the item advertised therein is sold). In response to this determination, the for-sale group manager 110 can determine that the post is likely a sale listing.

Also, the for-sale group manager 110 can analyze posts within a particular group to identify structural similarities among the posts. In one or more embodiments, sale listings tend to have certain structural aspects and similarities (e.g., sale listings tend to include at least one digital photograph, tend to mention some monetary amount, tend to mention a location, etc.). Accordingly, in response to identifying various structural aspects and similarities among posts within a particular group, the for-sale group manager 110 may determine that the group is a for-sale group.

In addition to analyzing group membership and posts within the group, the for-sale group manager 110 can also analyze historical data associated with a particular group. For example, the for-sale group manager 110 can analyze historical group data to identify percentages of unique post authors and post commenters (i.e., post authors who are posting for the first time, post commenters who are commenting on a post or within the group for the first time). In one or more embodiments, for-sale groups tend to have a specific ratio of unique post authors and post commenters. For instance, the for-sale group manager 110 may determine that a particular group receives posts from unique post authors forty percent of the time. Thus, the for-sale group manager 110 may determine that the particular group is a for-sale group based on this identified percentage.

Additionally, the for-sale group manager 110 can analyze historical group data related to searches performed within the group. For example, a social networking system user can perform a search of a particular group. Accordingly, the for-sale group manager 110 can analyze a history of searches performed in connection with the particular group to identify common search topics. In one or more embodiments, searches performed in connection with a for-sale group tend to be centered on products or items, while searches performed in connection with other types of groups tend to be centered on discussion topics, news stories, etc. Thus, in response to determining that a certain percentage of searches performed in connection with a particular group are centered on products or items, the for-sale group manager 110 can determine that the group is a for-sale group.

As mentioned above, and as shown in FIG. 1, the commerce director 106 can also include a sale listing manager 112. Just as the for-sale group manager 110 can determine whether a social networking system group is likely a for-sale group, as described above, the sale listing manager 112 can determine whether a social networking system post is likely a sale listing. As mentioned above, a sale listing is a specific type of social networking system post wherein a user advertises an item that the user would like to sell. Accordingly, the sale listing manager 112 can monitor newsfeeds and groups within the social networking system 104 in order to identify posts that could potentially be sale listings.

In order to determine whether a social networking system post is a sale listing, the sale listing manager 112 can analyze various characteristics associated with the social networking system post. In one or more embodiments, the sale listing manager 112 can analyze the content of a particular post for indicators as to whether the post is a sale listing. For example, the sale listing manager 112 can analyze the particular post for specific types of multimedia. In at least one embodiment, sale listings tend to include multimedia (e.g., digital photographs, digital videos, digital audio, etc.) that features an item or product, rather than a person or a place. Accordingly, in response to identifying this type of multimedia in a post, the sale listing manager 112 may determine that the post is likely a sale listing.

Additionally, the sale listing manager 112 can analyze the particular post for various written characteristics in order to determine whether the post is a sale listing. For example, the sale listing manager 112 can identify phrases (e.g., "brand new," "gently used," "never been worn," etc.), transactional language (e.g., "For sale," "make me an offer," "only $50," etc.), acronyms (e.g., "ISO," "OBO," "PU," etc.), etc. within a post that indicate the post is a sale listing. In one or more embodiments, the sale listing manager 112 can utilize natural language processing, databases, web lookups, table lookups, machine learning, etc. in order to analyze written characteristics of a particular post.

In addition to analyzing content of a particular post, the sale listing manager 112 can also analyze social networking system activity associated with the particular post in order to determine whether the particular post is a sale listing. For example, sale listings tend to be associated with comments and messages that include certain phrases, transactional language, and acronyms such as those described above. Similarly, a sale listing tends to be associated with comments, messages, likes, and re-posts that are submitted by users who are not friends with the author of the sale listing or who have a low relationship coefficient with the author of the sale listing (i.e., are not close friends with the author of the sale listing). In at least one embodiment, a relationship coefficient between two users represents the amount of interaction that exists between the two users. A high relationship coefficient indicates that the two users are close friends.

Furthermore, the sale listing manager 112 can analyze structured data associated with the particular post in order to determine whether the particular post is a sale listing. For example, structured data associated with a particular post can include information associated with the author of the particular post, as well as information that indicates how the author submitted the particular post. In one or more embodiments, a post author can submit a post such that the social networking system 104 adds the post to the newsfeeds of all the post author's social networking system friends. Additionally or alternatively, the post author can submit the post such that the social networking system 104 adds the post to the newsfeeds of only select co-users within the social networking system 104. Furthermore, the post author can submit the post such that the social networking system 104 adds the post to a particular group or groups. In at least one embodiment, sale listing authors tend to submit sale listings to specific for-sale group and/or specific friends who the sale listing author believes might be interested.

In one or more embodiments, in determining whether a social networking group is a for-sale group and whether a social networking system post is a sale listing, the for-sale group manager 110 and the sale listing manager 112 may utilize a scoring system. For example, both managers 110, 112 may assign a score to each characteristic identified within a group or post that indicates whether the group is a for-sale group or whether the post is a sale listing. In one or more embodiments, the for-sale group manager 110 and/or the sale listing manager 112 may assign a higher score to certain characteristics, such as post content, that are more indicative of a group being a for-sale group or a post being a sale listing. Next, the managers 110, 112 can calculate a total score for the group or post based on an aggregate of all the identified characteristic scores. If the total score for the group or post is above a predetermined threshold, the for-sale group manager 110 or the sale listing manager 112 can determine that the identified characteristics are indicative of the group or post being a for-sale group or sale listing, respectively.

In response to determining that the identified characteristics are indicative of the group or post being a for-sale group or sale listing, respectively, the managers 110, 112 can update information associated with the group or post to indicate that the group is a for-sale group, or the post is a sale listing. For example, the managers 110, 112 can update structured data associated the group or post with a specific classification. Additionally or alternatively, the manager 110, 112 can update the display of the group or post to include a label, a visual display scheme, a description, etc. that helps the group or post stand out as a for-sale group or sale listing.

Furthermore, as mentioned above, and as illustrated in FIG. 1, the commerce director 106 can also include a data storage 114. As shown, the data storage 114 can include social networking system activity data 116, for-sale group data 118, and sale listing data 120. In one or more embodiments, the social networking system activity data 116 can include data representative of social networking system activity information, such as described herein. Similarly, in one or more embodiments, the for-sale group data 118 can include data representative of for-sale group information, such as described herein. Furthermore, in one or more embodiments, the sale listing data 120 can include data representative of sale listing information, such as described herein.

Additionally, in one or more embodiments and as illustrated in FIG. 1, the social networking system 104 may include a social graph 122 for representing and analyzing a plurality of users and concepts. Node information 124 of the social graph 122 can store node information comprising nodes for users nodes for concepts, nodes for transactions, and nodes for items. Edge information 126 of the social graph 122 can store edge information comprising relationships between nodes and/or actions occurring within the social networking system 104. Further detail regarding the social networking system 104, social graphs, edges, and nodes is presented below with respect to FIGS. 7 and 8.

Figure 2:
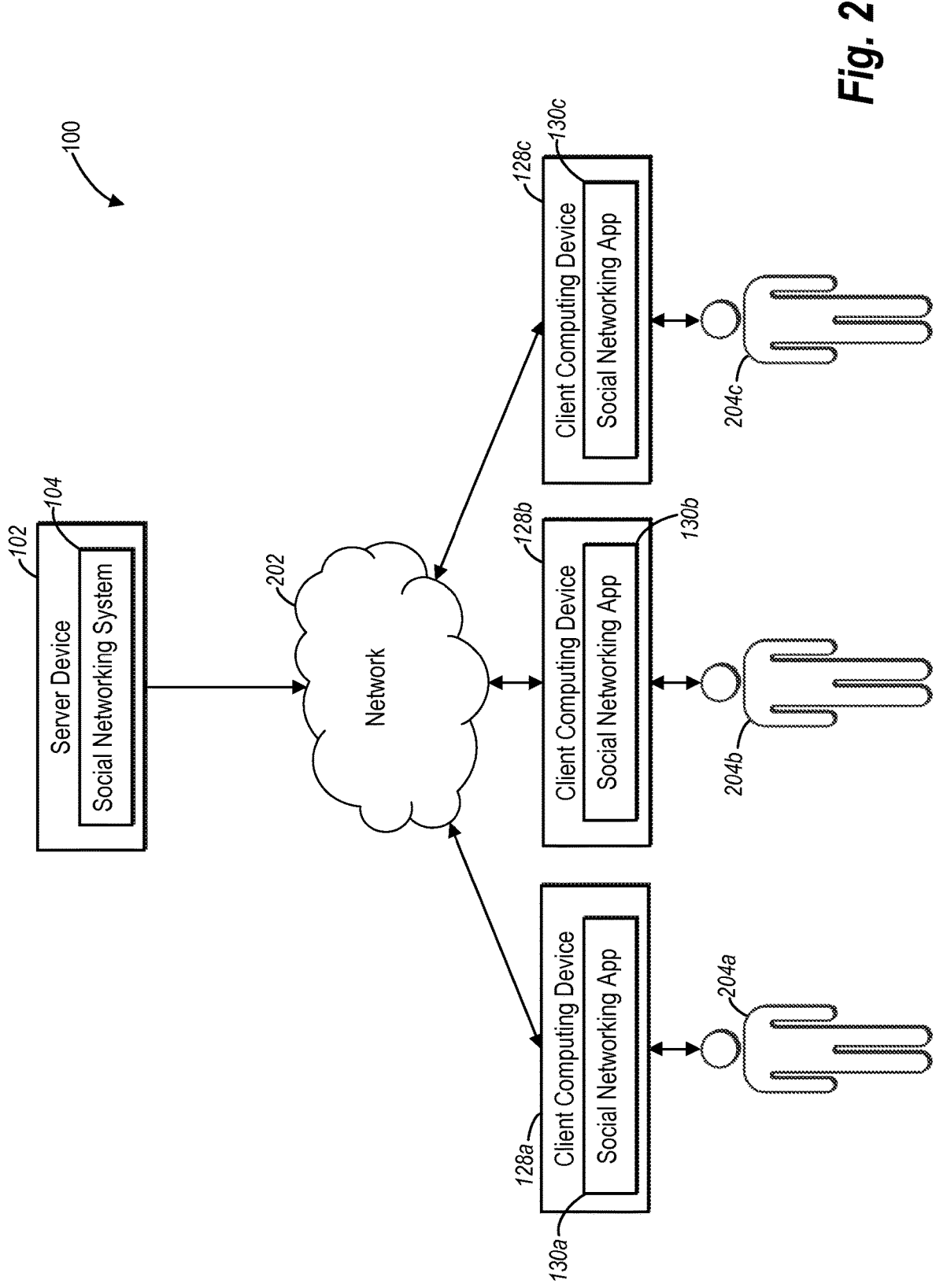
FIG. 2 illustrates a block diagram of an environment for implementing the commerce system in accordance with one or more embodiments.

FIG. 2 illustrates an example schematic diagram of the commerce system 100. As illustrated in FIG. 2, the commerce system 100 may include client computing devices 128a, 128b, and 128c each running the social networking applications 130a, 130b, and 130c respectively, as well as the server device 102 housing the social networking system 104. Also as illustrated in FIG. 2, the users 204a, 204b, and 204c may interact with the client computing devices 128a, 128b, and 128c respectively in order to access content and/or services on the social networking system 104. Each of the client computing devices 128a, 128b, and 128c may access the social networking system 104 via the social networking applications 130a, 130b, and 130c, as described above.

The client computing devices 128a, 128b, and 128c and the social networking system 104 can communicate via the network 202, which may include one or more networks and may use one or more communication platforms or technologies suitable for transmitting data and/or communication signals. In one or more embodiments, the network 202 may include the Internet or World Wide Web. The network 202, however, can include various other types of networks that use various communication technologies and protocols, such as a corporate intranet, a virtual private network (VPN), a local area network (LAN), a wireless local network (WLAN), a cellular network, a wide area network (WAN), a metropolitan area network (MAN), or a combination of two or more such networks. Although FIG. 2 illustrates a particular arrangement of client computing devices 128a, 128b, and 128c, the social networking system 104, the server device 102, and the network 202, various additional arrangements are possible. For example, the client computing devices 128a, 128b, and 128c may directly communicate with the social networking system 104, bypassing the network 202. Additional details relating to the network 202 are explained below with reference to FIG. 7.

As illustrated in FIG. 2, the users 204a, 204b, and 204c can use the commerce system 100 to transact the purchase and sale of items. As described above, the users 204a, 204b, and 204c may be individuals (i.e., human users), businesses, groups, or other entities. Although FIG. 2 illustrates three users 204a, 204b, and 204c, it is understood that the commerce system 100 can allow a plurality of users to exchange communications and transactions via a corresponding plurality of client computing devices.

With reference to the commerce system 100 described herein, any of the users 204a, 204b, or 204c may be a sender of a post, sale listing, or electronic message, and any of the users 204a, 204b, or 204c may be a recipient of a post, sale listing, or electronic message. In certain embodiments, the social networking system 104 can ensure the users 204a, 240b, 204c are "friends" via the social networking system 104 before they can send and receive posts, sale listings, or electronic messages among each other. In additional or alternative embodiments, the social networking system 104 may simply ensure that users sending and receiving communications merely be active users of the social networking system 104.

The client computing devices 128a, 128b, 128c may include various types of computing devices. For example, the client computing devices 128a, 128b, 128c can include a mobile device such as a mobile telephone, a smartphone, a PDA, a tablet, a laptop or a non-mobile device such as a desktop, a server, or another type of computing device. Further, the client computing devices 128a, 128b, 128c may run dedicated social networking applications (e.g., such as the social networking applications 130a, 130b, 130c, as described above in relation to FIG. 1) associated with the social networking system 104 to access social networking content (e.g., posts, messages, sale listings, profiles, etc.) associated with the commerce system 100. Additional details with respect to the client computing devices 128a, 128b, 128c are discussed below with respect to FIG. 7.

As will be described in more detail below, the components of the commerce system 100 as described with regard to FIGS. 1 and 2 can provide, along and/or in combination with other components, one or more graphical user interfaces ("GUIs"). In particular, the components can allow a user to interact with a collection of display elements for a variety of purposes. Specifically, FIGS. 3A and 3B and the description that follows illustrate various example embodiments of the GUIs and features that are in accordance with general principles as described above.

Figure 3B:
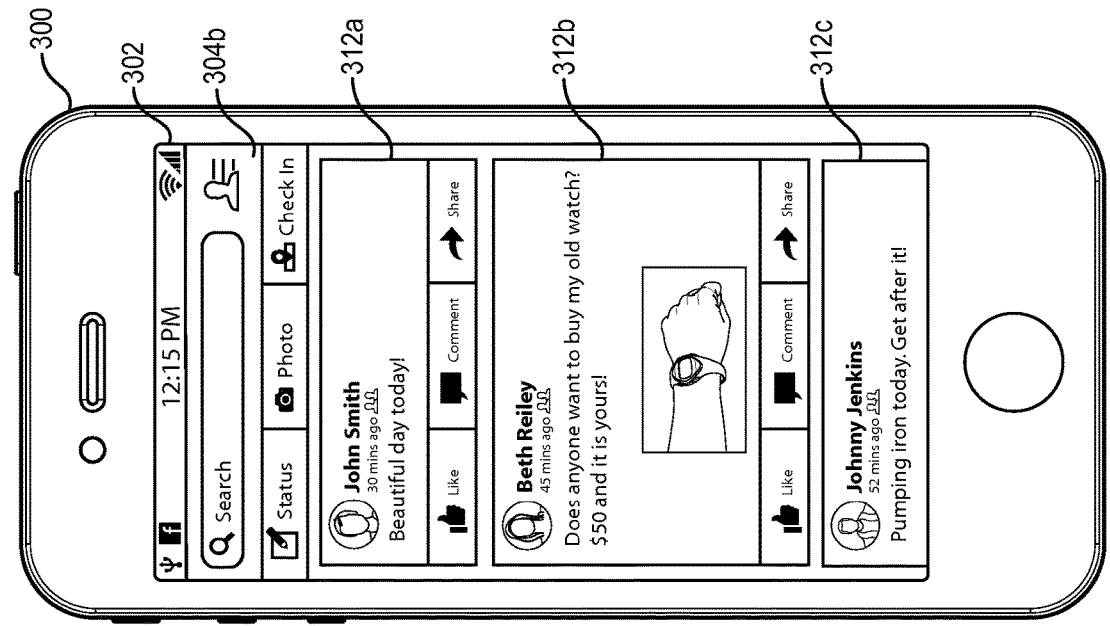
FIGS. 3A-3B illustrate a series of user interfaces in connection with the commerce system in accordance with one or more embodiments.
Figure 3A:
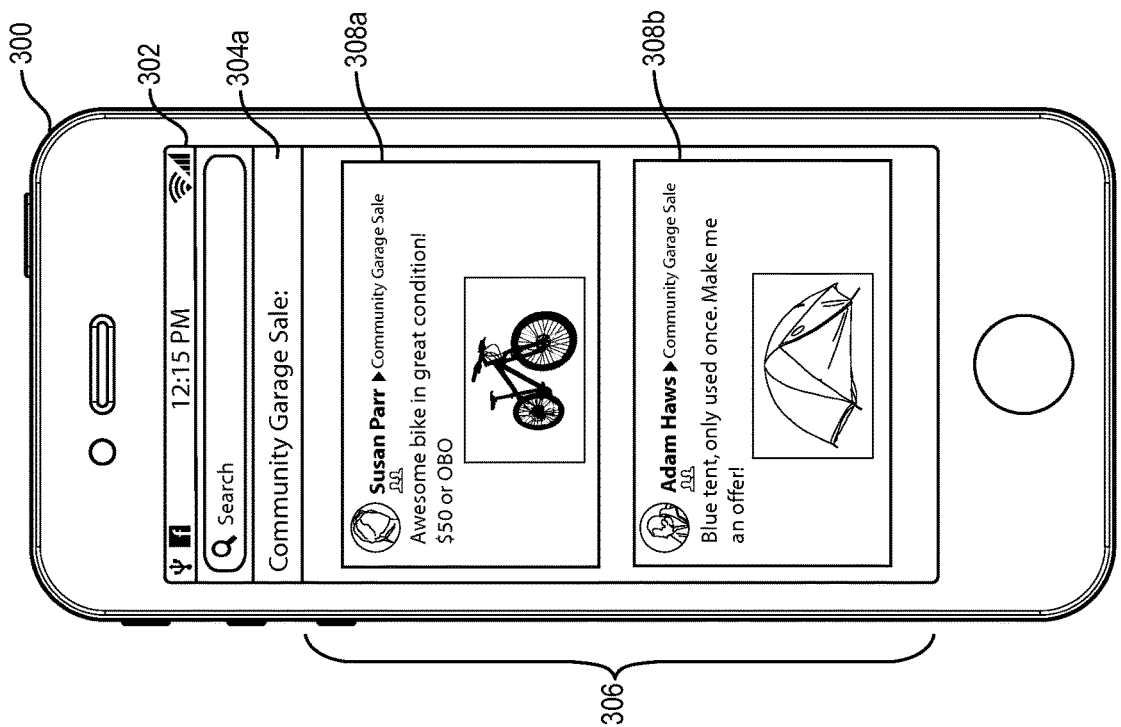

For example, FIGS. 3A-3B illustrate various views of GUIs provided at one of the client computing devices 128a, 128b, 128c by way of the social networking application 130a, 130b, 130c, respectively. As mentioned above, in some embodiments, a client computing device (i.e., the client computing device 128a, 128b, 128c) can implement and/or provide features from the commerce system 100. For example, FIG. 3A illustrates a client computing device 300 of a social networking system user (e.g., one of the users 204a, 204b, 204c) that may implement one or more of the components or features of the commerce director 106. As shown, the client computing device 300 is a handheld device, such as a mobile phone device (e.g., a smartphone). As used herein, the term "handheld device" refers to a device sized and configured to be held/operated in a single hand of a user. In additional or alternative examples, however, any other suitable computing device, such as, but not limited to, a tablet device, larger wireless device, laptop or desktop computer, a personal digital assistant device, and/or any other suitable computing device can perform one or more of the processes and/or operations described herein.

As illustrated in FIG. 3A, the client computing device 300 includes a touch screen display 302 that can display user interfaces and by way of which user input may be received and/or detected. As used herein, a "touch screen display" refers to the display of a touch screen device. In one or more embodiments, a touch screen device may be the client computing device 128a, 128b, or 128c with at least one surface upon which a user may perform touch gestures (e.g., a laptop, a tablet computer, a personal digital assistant, a media player, a mobile phone, etc.). Additionally or alternatively, the client computing device 300 may include any other suitable input device, such as a touch pad or those described below in reference to FIG. X.

In FIG. 3A, the touch screen display 302 of the client computing device 300 displays a social networking system group GUI 304a provided by the GUI manager 132 of the social networking application 130 installed thereon. In one or more embodiments, the GUI manager 132 provides the social networking system group GUI 304a in order to provide a display of one or more posts within a particular social networking system group. In at least one embodiment, the social networking system group GUI 304a can include a group display 306 that lists one or more social networking system group posts 308a, 308b. As mentioned above, a user of the client computing device 300 may be a member of the group displayed in the social networking system group GUI 304a, and the social networking system group GUI 304a may be scrollable in order for the user of the client computing device 300 to see all the posts/sale listings displayed therein.

As discussed above, the for-sale group manager 110 can analyze information associated with a particular social networking system group in order to determine whether the group is a for-sale group. The for-sale group manager 110 can analyze characteristics such as, but not limited to, interactions related to a group, relationships related to the group, the membership of a group, structured data associated with the group, and historical data associated with the group in order to determine whether the group is a for-sale group. Additionally, as shown in FIG. 3A, the for-sale group manager 110 can also analyze information associated with posts within the group in order to determine whether the group is a for-sale group. For example, as shown in FIG. 3A, the for-sale group manager 110 can analyze each of the group posts 308a, 308b to determine whether each of the group posts 308a, 308b are likely sale listings. If the for-sale group manager 110 determines that it is likely the group posts 308a, 308b are sale listings, the for-sale group manager 110 can determine the group displayed within the social networking system group GUI 304a is likely a for-sale group.

The for-sale group manager 110 can analyze the group posts 308a, 308b by identifying various characteristics associated with each of the group posts 308a, 308b. As mentioned above, a post can include certain written characteristics, multimedia characteristics, etc. that are indicative of whether the post is a sale listing. For example, the for-sale group manager 110 can analyze the group post 308a to identify the following characteristics: a product name (i.e., "bike"), transactional language (i.e., "great condition," "$50"), a specific acronym (i.e., "OBO" means "or best offer"), and a digital photograph of a product that matches the product name in the description. Similarly, the for-sale group manager 110 can analyze the group post 308b to identify the following indicators: a product name (i.e., "tent"), transactional language (i.e., "only used once," "Make me an offer."), and a digital photograph of a product that matches the product name in the description. Accordingly, in response to identifying these indicators within the group posts 308a, 308b, the for-sale group manager 110 can determine that the group posts 308a, 308b are likely sale listings and that the group displayed within the social networking system group GUI 304a is likely a for-sale group.

In response to identifying the characteristics related to the group posts 308a, 308b, as well as other characteristics such as those described above, the for-sale group manager 110 can determine that the identified characteristics are indicative of the group displayed within the social networking system group GUI 304a being a for-sale group. Accordingly, in one or more embodiments, the for-sale group manager 110 can update information associated with the group displayed within the social networking system group GUI 304a to specifically indicate that the group is a for-sale group. In at least one embodiment, the for-sale group manager 110 can update structured data associated with the group displayed within the social networking system group GUI 304a to specifically indicate that the group is a for-sale group. Furthermore, in additional or alternative embodiments, the for-sale group manager 110 can update the display of the social networking system group GUI 304a to include words, colors, themes, etc. that indicate the group is a for-sale group.

Next, as described above, the sale listing manager 112 can determine whether a social networking system post is likely a sale listing. The sale listing manager 112 can make this determination based on characteristics such as, but not limited to, structured data associated with the post and social networking activity associated with the post. The sale listing manager 112 can also analyze the content characteristics of a particular post to determine whether the post is a sale listing.

For example, as shown in FIG. 3B, the GUI manager 132 of the social networking application 130 can display a newsfeed GUI 308b on the touch screen display 302 of the client computing device 300. The newsfeed GUI 308b can include newsfeed posts 312a, 312b, 312c within a newsfeed 310. In one or more embodiments, the newsfeed posts 312a, 312b, 312c are submitted by friends of a user of the client computing device 300.

The sale listing manager 112 can analyze each of the newsfeed posts 312a, 312b, 312c to identify one or more characteristics that indicate whether each of the newsfeed posts 312a, 312b, 312c is a sale listing. For example, the sale listing manager 112 can analyze the newsfeed post 312a (i.e., "Beautiful day today!") to determine that the newsfeed post 312a contains no product names, transactional language, multimedia featuring a product, etc. Similarly, the sale listing manager 112 can analyze the newsfeed post 312c (i.e., "Pumping iron today. Get after it!") to determine that the newsfeed post 312c contains no product names, transactional language, multimedia featuring a product, etc. In response to these determinations, the sale listing manager 112 may determine that neither the newsfeed post 312a nor the newsfeed post 312c are sale listings.

The sale listing manager 112 can analyze the newsfeed post 312b to identify characteristics including a product name (i.e., "watch"), transactional language (i.e., "want to buy," and "$50"), and a digital photograph of a product that matches the product name in the description. In response to identifying these characteristics and other non-displayed characteristics (e.g., characteristics related to structured data, relationship information, etc.), the sale listing manager 112 can determine that the newsfeed post 312b is likely a sale listing. As laid out above, the sale listing manager 112 can make this determination because the identified characteristics are indicative of the post being a sale listing.

Once the sale listing manager 112 determines that the newsfeed post 312b is likely a sale listing, the sale listing manager 112 can update classification information associated with the newsfeed post 312b to indicate the newsfeed post 312b is a sale listing. Furthermore, the sale listing manager 112 can alter the newsfeed post 312b to include a visual cue to inform a user that the newsfeed post 312b is a sale listing. Furthermore, once the sale listing manager 112 determines that the newsfeed post 312b is likely a sale listing, the sale listing manager 112 can include extra functionality in connection with the newsfeed post 312b such as specific transactional functionality, specific messaging functionality, etc.

FIGS. 3A-3B, the corresponding text, and the examples, provide a number of different methods, systems, and devices for identifying for-sale groups and sale listings within a social networking system. In addition to the foregoing, embodiments can also be described in terms of flowcharts comprising acts and steps in a method for accomplishing a particular result. For example, FIGS. 4 and 5 may be performed with less or more steps/acts or the steps/acts may be performed in differing orders. Additionally, the steps/acts described herein may be repeated or performed in parallel with one another or in parallel with different instances of the same or similar steps/acts.

Figure 4:
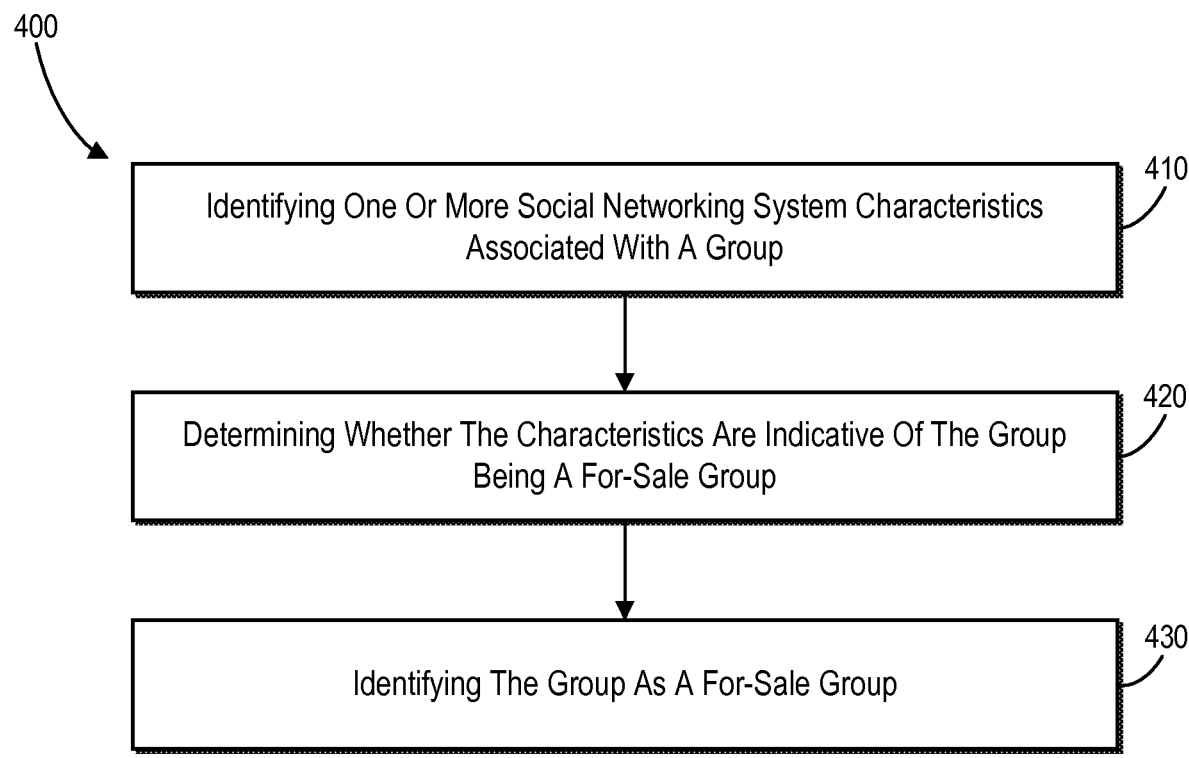
FIG. 4 illustrates a flowchart of a series of acts in a method of identifying for-sale groups in accordance with one or more embodiments.

FIG. 4 illustrates a flowchart of one example method 400 of identifying a for-sale group within a social networking system. The method 400 includes an act 410 identifying one or more social networking system characteristics associated with a group. In particular, the act 410 can involve identifying one or more social networking system characteristics related to a social networking system group. In one or more embodiments, identifying one or more social networking system characteristics related to the social networking system group involves identifying one or more of interactions related to the social networking system group, connections related to the social networking system group, and information related to one or more posts within the social networking system group. For example, identifying interactions related to the social networking system group includes identifying one or more of comments associated with posts within the social networking system group, "likes" associated with posts within the social networking system group, shares of posts within the social networking system group, reposts of posts within the social networking system group, and searches performed in association with the social networking system group.

Additionally, in one or more embodiments, identifying connections related to the social networking system group can include identifying one or more of connections between users of the social networking system group, connection coefficients between users of the social networking system group, demographic information related to users of the social networking system group, and social networking system information related to users of the social networking system group. Similarly, identifying information related to one or more posts within the social networking system group can include identifying: keywords, acronyms, brand names, phrases, or transactional language within the one or more posts; multimedia within the one or more posts; display timing associated with the one or more posts; structural similarities between the one or more posts; information specific to an author of the one or more posts; and a submission point associated with the one or more posts.

Additionally, the method 400 includes an act 420 of determining whether the characteristics are indicative of the group being a for-sale group. In particular, the act 420 can involve determining whether the one or more social networking system characteristics are indicative of the social networking system group being a for-sale group. In one or more embodiments, determining whether the one or more social networking system characteristics are indicative of the social networking system group being a for-sale group can include: calculating, based on the identified social networking system characteristics, a score associated with the social networking system group; if the calculated score is above a predetermined threshold, determining that the one or more social networking system characteristics are indicative of the social networking system group being a for-sale group; if the calculated score is not above the predetermined threshold, determining that the one or more social networking system characteristics are not indicative of the social networking system group being a for-sale group.

Furthermore, the method 400 includes an act 420 of identifying the group as a for-sale group. In particular, the act 430 can involve identifying, based on the determination whether the one or more social networking system characteristics are indicative of the social networking system group being a for-sale group, the social networking system group as a for-sale group. The method 400 can also include a step of identifying classification information associated with the social networking system group. In that case, identifying, based on the determination whether the one or more social networking system characteristics are indicative of the social networking system group being a for-sale group, the social networking system group as a for-sale group can include updating the identified classification information associated with the social networking system group to indicate the social networking system group is a for-sale group.

Figure 5:
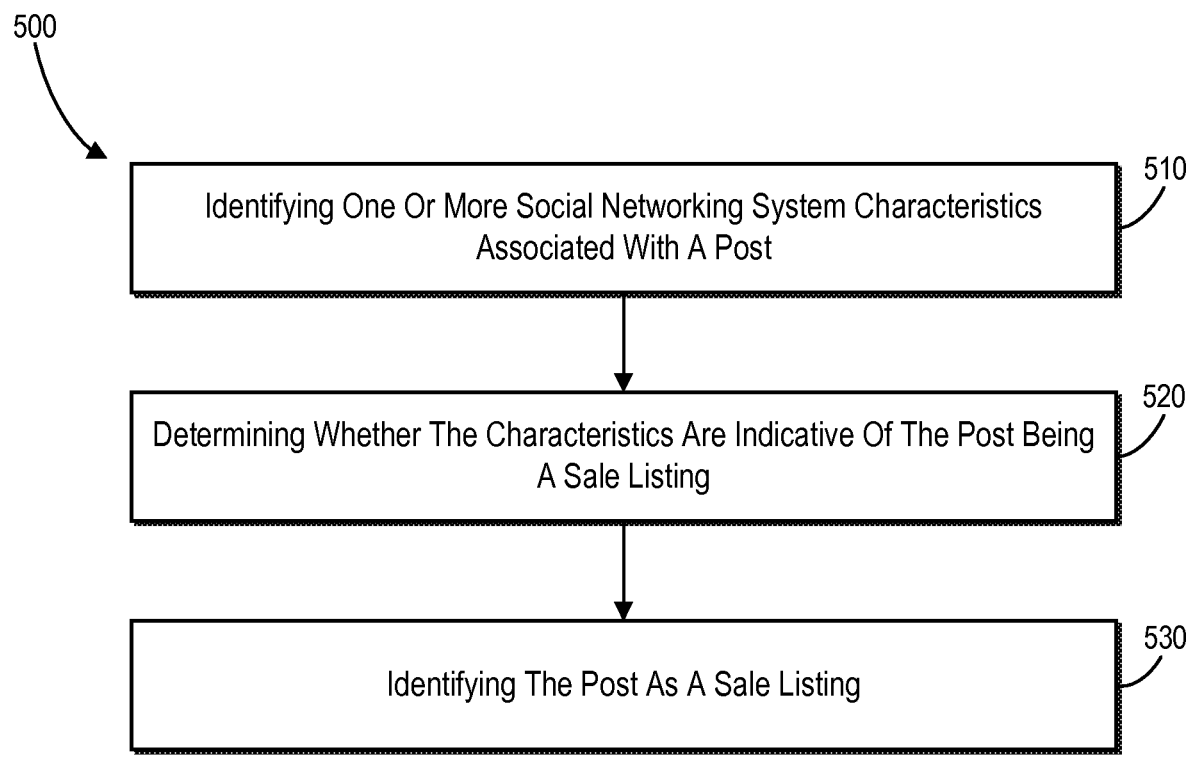
FIG. 5 illustrates a flowchart of a series of acts in a method of identifying sale listings in accordance with one or more embodiments.

FIG. 5 illustrates a flowchart of one example method 500 of identifying a social networking system post as a sale listing. The method 500 includes an act 510 of identifying one or more social networking system characteristics associated with a post. In particular, the act 510 can involve identifying one or more social networking system characteristics related to a social networking system post. In one or more embodiments, identifying one or more social networking system characteristics related to the social networking system post can include identifying one or more of interactions related to the social networking system post, connections related to the social networking system post, and information related to the social networking system post.

For example, identifying interactions related to the social networking system post can include identifying one or more of comments associated with the social networking system post, "likes" associated with the social networking system post, shares of the social networking system post, reposts of the social networking system post, and searches associated with the social networking system post. Additionally, identifying connections related to the social networking system post can include identifying one or more of connection between users associated with the social networking system post, connection coefficients between users associated with the social networking system post, demographic information related to users associated with the social networking system post, and social networking system information related to users associated with the social networking system post. Furthermore, identifying information related to the social networking system post can include identifying: keywords, acronyms, brand names, phrases, or transactional language within the social networking system post; multimedia within the social networking system post; display timing associated with the social networking system post; structural aspects of the social networking system post; information specific to an author of the social networking system post; and a submission point associated with the social networking system post.

The method 500 also includes an act 520 of determining whether the characteristics are indicative of the post being a sale listing. In particular, the act 520 can involve determining whether the one or more social networking system characteristics are indicative of the social networking system post being a sale listing. For example, determining whether the one or more social networking system characteristics are indicative of the social networking system post being a sale listing can involve: calculating, based on the identified social networking system characteristics, a score associated with the social networking system post; if the calculated score is above a predetermined threshold, determining that the one or more social networking system characteristics are indicative of the social networking system post being a sale listing; if the calculated score is not above the predetermined threshold, determining that the one or more social networking system characteristics are not indicative of the social networking system post being a sale listing.

Furthermore, the method 500 includes an act 530 of identifying the post as a sale listing. In particular, the act 530 can involve identifying, based on the determination whether the one or more social networking system characteristics are indicative of the social networking system post being a sale listing, the social networking system post as a sale listing. The method 500 can also include an act of identifying classification information associated with the social networking system post. In that case, identifying, based on the determination whether the one or more social networking system characteristics are indicative of the social networking system post being a sale listing, the social networking system post as a sale listing can involve updating the identified classification information associated with the social networking system post to indicate the social networking system post is a sale listing.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
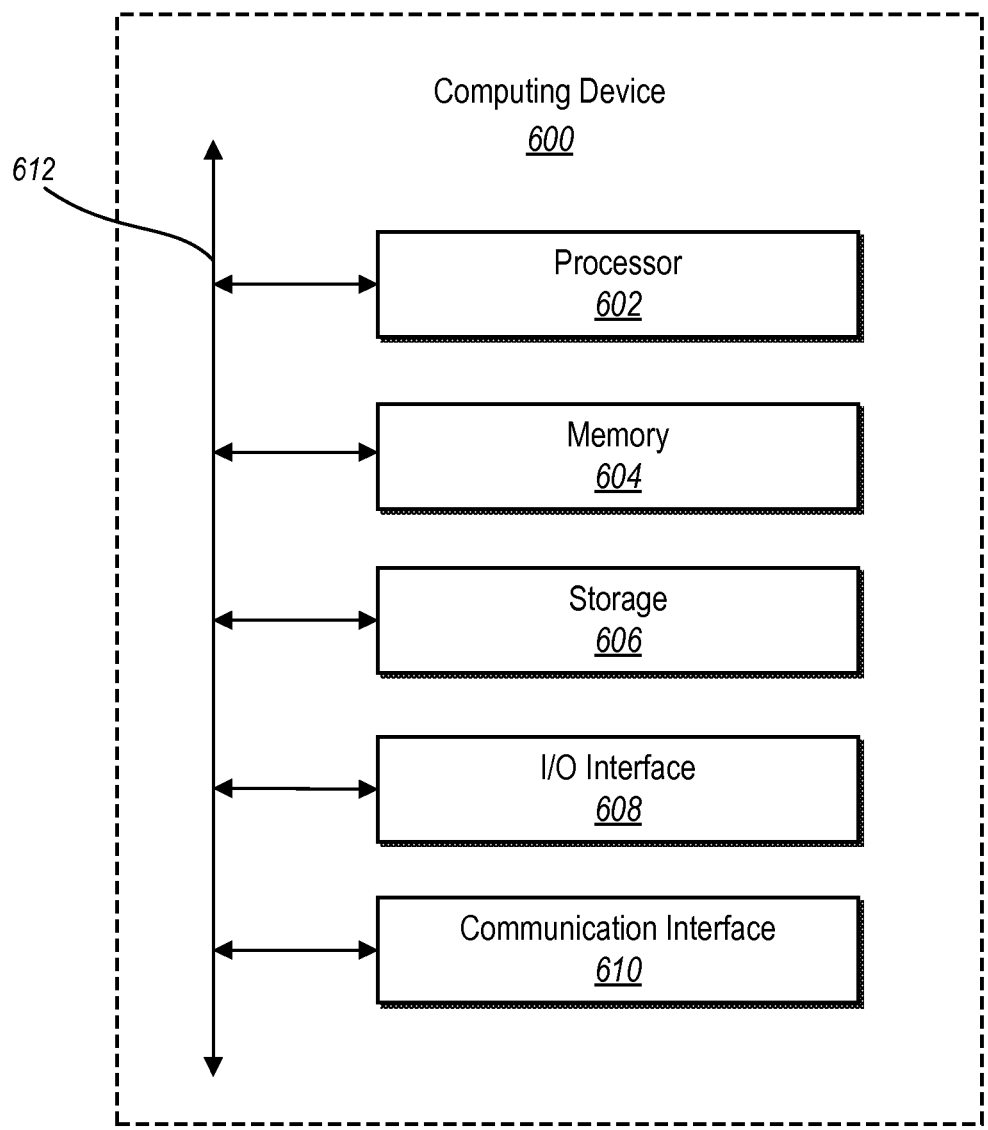
FIG. 6 illustrates a block diagram of an exemplary computing device in accordance with one or more embodiments.

FIG. 6 illustrates a block diagram of exemplary computing device 600 that may be configured to perform one or more of the processes described above. One will appreciate that one or more computing devices such as the computing device 600 may implement the system 100. As shown by FIG. 6, the computing device 600 can comprise a processor 602, a memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In one or more embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In one or more embodiments, the processor 602 may include one or more internal caches for data, instructions, or addresses. As an example and not by way of limitation, the processor 602 may include one or more instruction caches, one or more data caches, and one or more translation lookaside buffers (TLBs). Instructions in the instruction caches may be copies of instructions in the memory 604 or the storage 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In one or more embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar.

Similarly to events, the calendar entries may include times, dates, locations and identities of other users.

Figure 7:
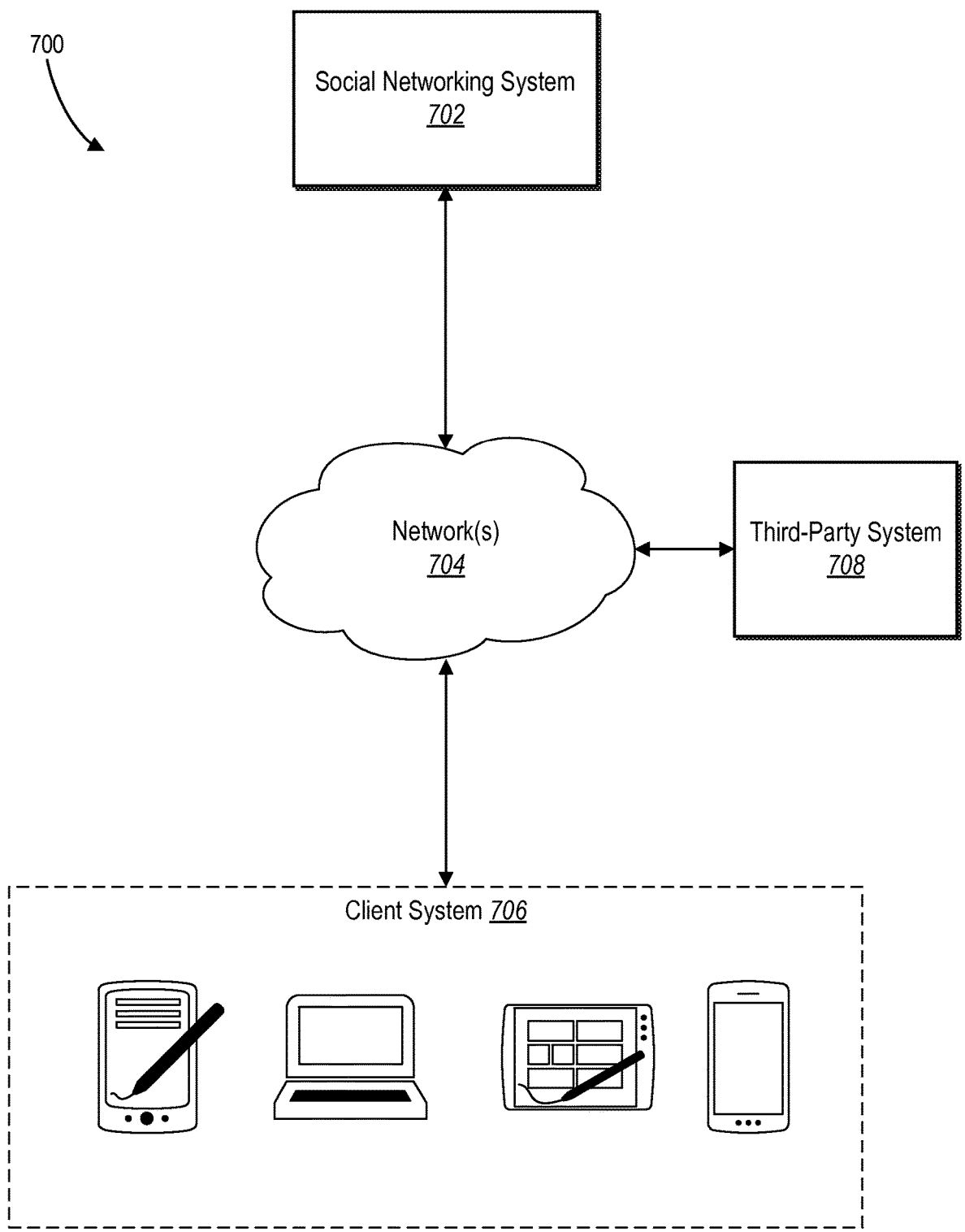
FIG. 7 is an example network environment of a social networking system in accordance with one or more embodiments.

FIG. 7 illustrates an example network environment 700 of a social networking system. Network environment 700 includes a client system 706, a social networking system 702, and a third-party system 708 connected to each other by a network 704. Although FIG. 7 illustrates a particular arrangement of client system 706, social networking system 702, third-party system 708, and network 704, this disclosure contemplates any suitable arrangement of client system 706, social networking system 702, third-party system 708, and network 704. As an example and not by way of limitation, two or more of client system 706, social networking system 702, and third-party system 708 may be connected to each other directly, bypassing network 704. As another example, two or more of client system 706, social networking system 702, and third-party system 708 may be physically or logically co-located with each other in whole or in part. Moreover, although FIG. 7 illustrates a particular number of client systems 706, social networking systems 702, third-party systems 708, and networks 704, this disclosure contemplates any suitable number of client systems 706, social networking systems 702, third-party systems 708, and networks 704. As an example and not by way of limitation, network environment 700 may include multiple client system 706, social networking systems 702, third-party systems 708, and networks 704.

This disclosure contemplates any suitable network 704. As an example and not by way of limitation, one or more portions of network 704 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 704 may include one or more networks 704.

Links may connect client system 706, social networking system 702, and third-party system 708 to communication network 704 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client system 706 may be an electronic device including hardware, software, or embedded logic components or a combination of two or more such components and capable of carrying out the appropriate functionalities implemented or supported by client system 706. As an example and not by way of limitation, a client system 706 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 706. A client system 706 may enable a network user at client system 706 to access network 704. A client system 706 may enable its user to communicate with other users at other client systems 706.

In particular embodiments, client system 706 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 706 may enter a Uniform Resource Locator (URL) or other address directing the web browser to a particular server (such as server, or a server associated with a third-party system 708), and the web browser may generate a Hyper Text Transfer Protocol (HTTP) request and communicate the HTTP request to server. The server may accept the HTTP request and communicate to client system 706 one or more Hyper Text Markup Language (HTML) files responsive to the HTTP request. Client system 706 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 702 may be a network-addressable computing system that can host an online social network. Social networking system 702 may generate, store, receive, and send social-networking data, such as, for example, user-profile data, concept-profile data, social-graph information, or other suitable data related to the online social network. Social networking system 702 may be accessed by the other components of network environment 700 either directly or via network 704. In particular embodiments, social networking system 702 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 702 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 706, a social networking system 702, or a third-party system 708 to manage, retrieve, modify, add, or delete, the information stored in data store.

In particular embodiments, social networking system 702 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 702 may provide users of the online social network the ability to communicate and interact with other users. In particular embodiments, users may join the online social network via social networking system 702 and then add connections (e.g., relationships) to a number of other users of social networking system 702 whom they want to be connected to. Herein, the term "friend" may refer to any other user of social networking system 702 with whom a user has formed a connection, association, or relationship via social networking system 702.

In particular embodiments, social networking system 702 may provide users with the ability to take actions on various types of items or objects, supported by social networking system 702. As an example and not by way of limitation, the items and objects may include groups or social networks to which users of social networking system 702 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 702 or by an external system of third-party system 708, which is separate from social networking system 702 and coupled to social networking system 702 via a network 704.

In particular embodiments, social networking system 702 may be capable of linking a variety of entities. As an example and not by way of limitation, social networking system 702 may enable users to interact with each other as well as receive content from third-party systems 708 or other entities, or to allow users to interact with these entities through an application programming interfaces (API) or other communication channels.

In particular embodiments, a third-party system 708 may include one or more types of servers, one or more data stores, one or more interfaces, including but not limited to APIs, one or more web services, one or more content sources, one or more networks, or any other suitable components, e.g., that servers may communicate with. A third-party system 708 may be operated by a different entity from an entity operating social networking system 702. In particular embodiments, however, social networking system 702 and third-party systems 708 may operate in conjunction with each other to provide social-networking services to users of social networking system 702 or third-party systems 708. In this sense, social networking system 702 may provide a platform, or backbone, which other systems, such as third-party systems 708, may use to provide social-networking services and functionality to users across the Internet.

In particular embodiments, a third-party system 708 may include a third-party content object provider. A third-party content object provider may include one or more sources of content objects, which may be communicated to a client system 706. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 702 also includes user-generated content objects, which may enhance a user's interactions with social networking system 702. User-generated content may include anything a user can add, upload, send, or "post" to social networking system 702. As an example and not by way of limitation, a user communicates posts to social networking system 702 from a client system 706. Posts may include data such as status updates or other textual data, location information, photos, videos, links, music or other similar data or media. Content may also be added to social networking system 702 by a third-party through a "communication channel," such as a newsfeed or stream.

In particular embodiments, social networking system 702 may include a variety of servers, sub-systems, programs, modules, logs, and data stores. In particular embodiments, social networking system 702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 702 may also include suitable components such as network interfaces, security mechanisms, load balancers, failover servers, management-and-network-operations consoles, other suitable components, or any suitable combination thereof. In particular embodiments, social networking system 702 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 702 to one or more client systems 706 or one or more third-party system 708 via network 704. The web server may include a mail server or other messaging functionality for receiving and routing messages between social networking system 702 and one or more client systems 706. An API-request server may allow a third-party system 708 to access information from social networking system 702 by calling one or more APIs. An action logger may be used to receive communications from a web server about a user's actions on or off social networking system 702. In conjunction with the action log, a third-party-content-object log may be maintained of user exposures to third-party-content objects. A notification controller may provide information regarding content objects to a client system 706. Information may be pushed to a client system 706 as notifications, or information may be pulled from client system 706 responsive to a request received from client system 706. Authorization servers may be used to enforce one or more privacy settings of the users of social networking system 702. A privacy setting of a user determines how particular information associated with a user can be shared. The authorization server may allow users to opt in to or opt out of having their actions logged by social networking system 702 or shared with other systems (e.g., third-party system 708), such as, for example, by setting appropriate privacy settings. Third-party-content-object stores may be used to store content objects received from third parties, such as a third-party system 708. Location stores may be used for storing location information received from client systems 706 associated with users. Advertisement-pricing modules may combine social information, the current time, location information, or other suitable information to provide relevant advertisements, in the form of notifications, to a user.

Figure 8:
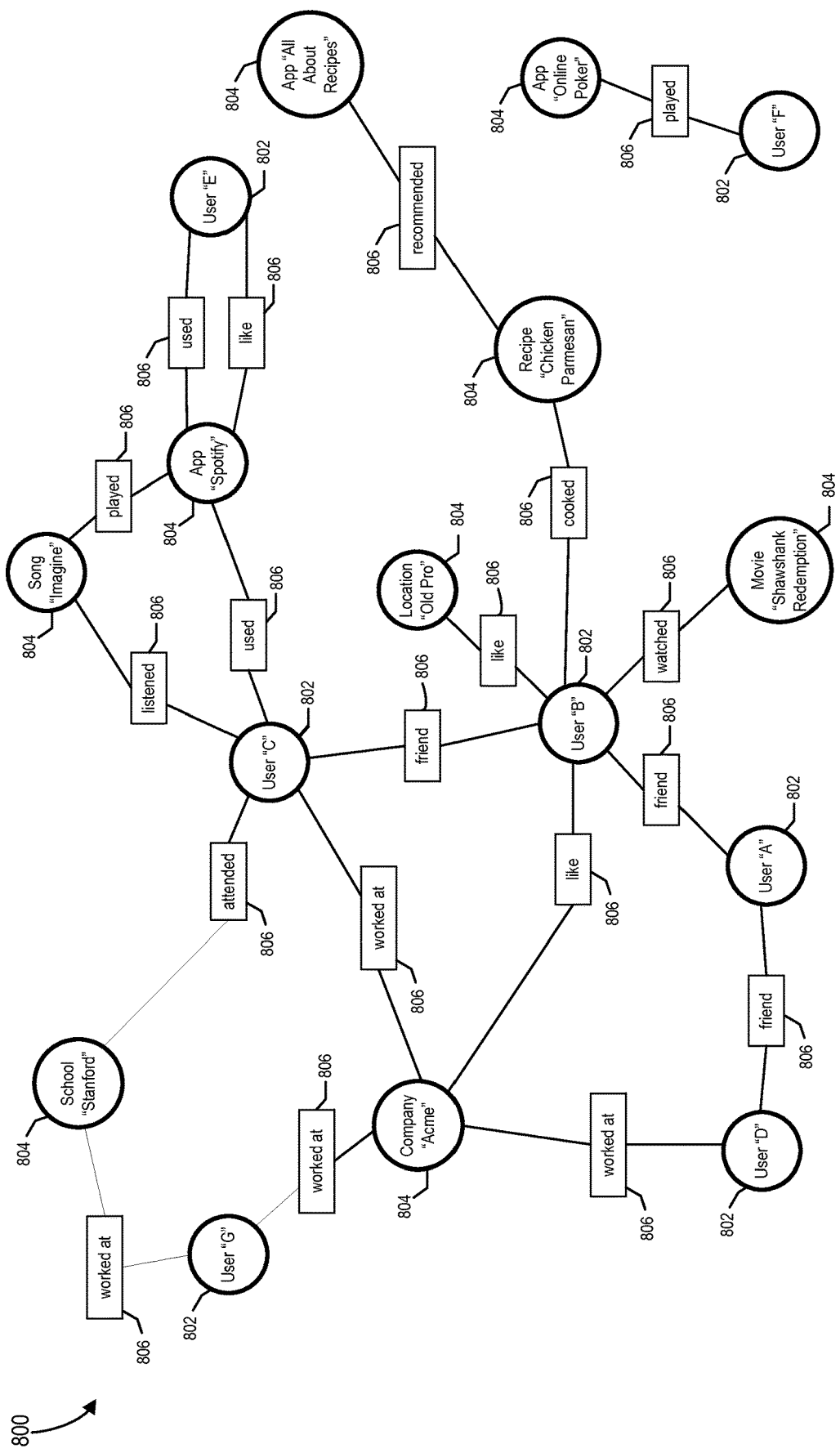
FIG. 8 illustrates a social graph in accordance with one or more embodiments.

FIG. 8 illustrates example social graph 800. In particular embodiments, social networking system 702 may store one or more social graphs 800 in one or more data stores. In particular embodiments, social graph 800 may include multiple nodes—which may include multiple user nodes 802 or multiple concept nodes 804—and multiple edges 806 connecting the nodes. Example social graph 800 illustrated in FIG. 8 is shown, for didactic purposes, in a two-dimensional visual map representation. In particular embodiments, a social networking system 702, client system 706, or third-party system 708 may access social graph 800 and related social-graph information for suitable applications. The nodes and edges of social graph 800 may be stored as data objects, for example, in a data store (such as a social-graph database). Such a data store may include one or more searchable or query able indexes of nodes or edges of social graph 800.

In particular embodiments, a user node 802 may correspond to a user of social networking system 702. As an example and not by way of limitation, a user may be an individual (human user), an entity (e.g., an enterprise, business, or third-party application), or a group (e.g., of individuals or entities) that interacts or communicates with or over social networking system 702. In particular embodiments, when a user registers for an account with social networking system 702, social networking system 702 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with social networking system 702. In particular embodiments, a user node 802 may be associated with information provided by a user or information gathered by various systems, including social networking system 702. As an example and not by way of limitation, a user may provide his or her name, profile picture, contact information, birth date, sex, marital status, family status, employment, education background, preferences, interests, or other demographic information. In particular embodiments, a user node 802 may be associated with one or more data objects corresponding to information associated with a user. In particular embodiments, a user node 802 may correspond to one or more webpages.

In particular embodiments, a concept node 804 may correspond to a concept. As an example and not by way of limitation, a concept may correspond to a place (such as, for example, a movie theater, restaurant, landmark, or city); a website (such as, for example, a website associated with social-network system 702 or a third-party website associated with a web-application server); an entity (such as, for example, a person, business, group, sports team, or celebrity); a resource (such as, for example, an audio file, video file, digital photo, text file, structured document, or application) which may be located within social networking system 702 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including social networking system 702. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to social networking system 702. Profile pages may also be hosted on third-party websites associated with a third-party server 808. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept node 804.

In particular embodiments, a concept node 804 may represent a third-party webpage or resource hosted by a third-party system 708. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 706 to send to social networking system 702 a message indicating the user's action. In response to the message, social networking system 702 may create an edge (e.g., an "eat" edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, social networking system 702 may send a "friend request" to the second user. If the second user confirms the "friend request," social networking system 702 may create an edge 806 connecting the first user's user node 802 to the second user's user node 802 in social graph 800 and store edge 806 as social-graph information in one or more of data stores. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to a edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, social networking system 702 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 702 may create a "listened" edge 806 and a "used" edge (as illustrated in FIG. 8) between user nodes 802 corresponding to the user and concept nodes 804 corresponding to the song and application to indicate that the user listened to the song and used the application. Moreover, social networking system 702 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, social networking system 702 may create an edge 806 between a user node 802 and a concept node 804 in social graph 800. As an example and not by way of limitation, a user viewing a concept-profile page (such as, for example, by using a web browser or a special-purpose application hosted by the user's client system 706) may indicate that he or she likes the concept represented by the concept node 804 by clicking or selecting a "Like" icon, which may cause the user's client system 706 to send to social networking system 702 a message indicating the user's liking of the concept associated with the concept-profile page. In response to the message, social networking system 702 may create an edge 806 between user node 802 associated with the user and concept node 804, as illustrated by "like" edge 806 between the user and concept node 804. In particular embodiments, social networking system 702 may store an edge 806 in one or more data stores. In particular embodiments, an edge 806 may be automatically formed by social networking system 702 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a newsfeed or ticker item on social networking system 702). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within newsfeeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 702 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 702) or RSVP (e.g., through social networking system 702) to an event associated with the advertisement. In addition or as an alternative, an advertisement may include social-networking-system context directed to the user. As an example and not by way of limitation, an advertisement may display information about a friend of the user within social networking system 702 who has taken an action associated with the subject matter of the advertisement.

In particular embodiments, social networking system 702 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 808 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 702 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 702 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 702 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 702 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 702 may calculate a coefficient based on a user's actions. Social networking system 702 may monitor such actions on the online social network, on a third-party system 708, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 702 may calculate a coefficient based on the user's actions with particular types of content. The content may be associated with the online social network, a third-party system 708, or another suitable system. The content may include users, profile pages, posts, news stories, headlines, instant messages, chat room conversations, emails, advertisements, pictures, video, music, other suitable objects, or any combination thereof. Social networking system 702 may analyze a user's actions to determine whether one or more of the actions indicate an affinity for subject matter, content, other users, and so forth. As an example and not by way of limitation, if a user may make frequently posts content related to "coffee" or variants thereof, social networking system 702 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 702 may calculate a coefficient based on the type of relationship between particular objects. Referencing the social graph 800, social networking system 702 may analyze the number and/or type of edges 806 connecting particular user nodes 802 and concept nodes 804 when calculating a coefficient. As an example and not by way of limitation, user nodes 802 that are connected by a spouse-type edge (representing that the two users are married) may be assigned a higher coefficient than a user nodes 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 702 may determine that the user has a higher coefficient with respect to the first photo than the second photo because having a tagged-in-type relationship with content may be assigned a higher weight and/or rating than having a like-type relationship with content. In particular embodiments, social networking system 702 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 702 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 800. As an example and not by way of limitation, social-graph entities that are closer in the social graph 800 (i.e., fewer degrees of separation) may have a higher coefficient than entities that are further apart in the social graph 800.

In particular embodiments, social networking system 702 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 706 of the user). A first user may be more interested in other users or concepts that are closer to the first user. As an example and not by way of limitation, if a user is one mile from an airport and two miles from a gas station, social networking system 702 may determine that the user has a higher coefficient for the airport than the gas station based on the proximity of the airport to the user.

In particular embodiments, social networking system 702 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 702 may provide information that is relevant to user's interests and current circumstances, increasing the likelihood that they will find such information of interest. In particular embodiments, social networking system 702 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 702 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 702 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 708 (e.g., via an API or other communication channel), or from another suitable system. In response to the request, social networking system 702 may calculate the coefficient (or access the coefficient information if it has previously been calculated and stored). In particular embodiments, social networking system 702 may measure an affinity with respect to a particular process. Different processes (both internal and external to the online social network) may request a coefficient for a particular object or set of objects. Social networking system 702 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 804 corresponding to a particular photo may have a privacy setting specifying that the photo may only be accessed by users tagged in the photo and their friends. In particular embodiments, privacy settings may allow users to opt in or opt out of having their actions logged by social networking system 702 or shared with other systems (e.g., third-party system 708). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 708, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 702 may send a request to the data store for the object. The request may identify the user associated with the request and may only be sent to the user (or a client system 706 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   identifying, using one or more processors, one or more social networking system characteristics related to users of a social networking system group and posts associated with the social networking system group;
   determining, using the one or more processors, that the social networking system group is a for-sale group by:
   calculating a score for the social networking system group based on whether each of the social networking system characteristics related to the users of the social networking system group and posts associated with the social networking system group indicates that the social networking system group is a for-sale group, and
   determining, based on a comparison of the score for the social networking system group to a predetermined threshold, that the social networking system group is a for-sale group;
   classifying, in response to determining that the social networking system group is a for-sale group, the social networking system group as a for-sale group within a social graph; and
   updating a display of the social networking system group to indicate that the social networking system group is classified as a for-sale group.

2. The method as recited in claim 1, wherein identifying one or more social networking system characteristics related to the users of the social networking system group and posts associated with the social networking system group comprises identifying one or more of interactions among the users of the social networking system group, relationships among users of the social networking system group, or information related to the posts associated with the social networking system group.

3. The method as recited in claim 2, wherein identifying interactions among users of the social networking system group comprises identifying one or more of comments associated with posts within the social networking system group, "likes" associated with posts within the social networking system group, shares of posts within the social networking system group, reposts of posts within the social networking system group, and searches performed in association with the social networking system group.

4. The method as recited in claim 2, wherein identifying relationships among users of the social networking system group comprises identifying one or more of relationship coefficients between users of the social networking system group, demographic information related to users of the social networking system group, and social networking system information related to users of the social networking system group.

5. The method as recited in claim 1, wherein identifying one or more social networking system characteristics related to users of the social networking system group and posts associated with the social networking system group comprises identifying information related to the posts associated with the social networking system group, the information comprising: keywords, acronyms, brand names, phrases, or transactional language within the posts; multimedia within the posts; display timing associated with the posts; structural similarities between the posts; information specific to an author of the posts; and a submission point associated with the posts.

6. The method as recited in claim 1, further comprising identifying classification information associated with the social networking system group.

7. The method as recited in claim 6, wherein classifying the social networking system group as a for-sale group comprises updating the identified classification information associated with the social networking system group within the social graph to indicate the social networking system group is a for-sale group.

8. A non-transitory computer-readable medium storing instructions thereon that, when executed by at least one processor, cause a computer system to:
   identify one or more social networking system characteristics related to users of a social networking system group and posts associated with the social networking system group;
   determine that the social networking system group is a for-sale group by:
   calculating a score for the social networking system group based on whether each of the social networking system characteristics related to the users of the social networking system group and posts associated with the social networking system group indicates that the social networking system group is a for-sale group, and
   determining, based on a comparison of the score for the social networking system group to a predetermined threshold, that the social networking system group is a for-sale group;
   classify, in response to determining that the social networking system group is a for-sale group, the social networking system group as a for-sale group within a social graph; and
   update a display of the social networking system group to indicate that the social networking system group is classified as a for-sale group.

9. The non-transitory computer-readable medium as recited in claim 8, wherein identifying one or more social networking system characteristics related to users of the social networking system group and posts associated with the social networking system group comprises identifying one or more of interactions among the users of the social networking system group, relationships among the users of the social networking system group, and information related to the posts associated with the social networking system group.

10. The non-transitory computer-readable medium as recited in claim 9, wherein identifying interactions among users of the social networking system post group comprises identifying comments associated with posts within the social networking system group, "likes" associated with posts within the social networking system group, shares of posts within the social networking system group, reposts of posts within the social networking system group, and searches performed in association with the social networking system group.

11. The methodnon-transitory computer readable medium as recited in claim 10, wherein identifying relationships among users of the social networking system post group comprises identifying one or more of relationship coefficients between users of the social networking system group, demographic information related to users of the social networking system group, and social networking system information related to users of the social networking system group.

12. The non-transitory computer-readable medium as recited in claim 11, wherein identifying information related to the posts associated with the social networking system group comprises identifying: keywords, acronyms, brand names, phrases, or transactional language within the posts associated with the social networking system group; multimedia within the posts associated with the social networking system group; display timing associated with the posts associated with the social networking system group; structural aspects of the posts associated with the social networking system group; information specific to authors of the posts associated with the social networking system group; and submission points associated with the posts associated with the social networking system group.

13. The non-transitory computer-readable medium as recited in claim 12, further comprising identifying classification information associated with the social networking system group, wherein classifying the social networking system group as a for-sale group comprises updating the identified classification information associated with the social networking system group within the social graph to indicate the social networking system group is a for-sale group.

14. A system comprising:
at least one processor; and
at least one non-transitory computer-readable storage medium storing instructions thereon that, when executed by the at least one processor, cause the system to:
identify one or more social networking system characteristics related to users of a social networking system group and posts associated with the social networking system group;
determine that the social networking system group is a for-sale group by:
calculating a score for the social networking system group based on whether each of the social networking system characteristics related to the users of the social networking system group and posts associated with the social networking system group indicates that the social networking system group is a for-sale group, and
determining, based on a comparison of the score for the social networking system group to a predetermined threshold, that the social networking system group is a for-sale group;
classify, in response to determining that the social networking system group is a for-sale group, the social networking system group as a for-sale group within a social graph; and
update a display of the social networking system group to indicate that the social networking system group is classified as a for-sale group.

15. The system as recited in claim 14, wherein identifying one or more social networking system characteristics related to the users of the social networking system group and posts associated with the social networking system group comprises identifying interactions among the users of the social networking system group, relationships among the users of the social networking system group, and information related to the posts associated with the social networking system group.

16. The system as recited in claim 15, wherein:
identifying interactions among the users of the social networking system group comprises identifying one or more of comments associated with posts within the social networking system group, "likes" associated with posts within the social networking system group, shares of posts within the social networking system group, reposts of posts within the social networking system group, and searches performed in association with the social networking system group;
identifying relationships among the users of the social networking system group comprises identifying one or more of relationship coefficients between users of the social networking system group, demographic information related to users of the social networking system group, and social networking system information related to users of the social networking system group;
identifying information related to one or more posts within the social networking system group comprises identifying: keywords, acronyms, brand names, phrases, or transactional language within the one or more posts; multimedia within the one or more posts; display timing associated with the one or more posts; structural similarities between the one or more posts; information specific to an author of the one or more posts; and a submission point associated with the one or more posts.

17. The system as recited in claim 16, further comprising instructions that, when executed by the at least one processor, cause the system to:
identify classification information associated with the social networking system group;
wherein, classifying the social networking system group as a for-sale group comprises updating the identified classification information associated with the social networking system group within the social graph to indicate the social networking system group is a for-sale group.

18. The method as recited in claim 1, wherein calculating the score for the social networking system group based on whether each of the social networking system characteristics related to the users of the social networking system group and posts associated with the social networking system group indicates that the social networking system group is a for-sale group comprises:
determining a value for each identified social networking system characteristic that correlates to how indicative the identified social networking system characteristic is of the social networking system group being a for-sale group; and
aggregating the determined values for the identified social networking system characteristics into the score associated with the social networking system group.

19. The non-transitory computer-readable medium as recited in claim 8, wherein calculating the score for the social networking system group based on whether each of the social networking system characteristics related to the users of the social networking system group and posts associated with the social networking system group indicates that the social networking system group is a for-sale group comprises:
determining a value for each identified social networking system characteristic that correlates to how indicative the identified social networking system characteristic is of the social networking system group being a for-sale group; and aggregating the determined values for the identified social networking system characteristics into the score associated with the social networking system group.

20. The system as recited in claim 14, wherein calculating the score for the social networking system group based on whether each of the social networking system characteristics related to the users of the social networking system group and posts associated with the social networking system group indicates that the social networking system group is a for-sale group comprises:

determining a value for each identified social networking system characteristic that correlates to how indicative the identified social networking system characteristic is of the social networking system group being a for-sale group; and aggregating the determined values for the identified social networking system characteristics into the score associated with the social networking system group.

\* \* \* \* \*